(12) United States Patent
Dauscher

(10) Patent No.: US 11,739,659 B2
(45) Date of Patent: Aug. 29, 2023

(54) SUPERCHARGING DEVICE

(71) Applicant: BorgWarner Inc., Auburn Hills, MI (US)

(72) Inventor: Sebastian Dauscher, Immesheim (DE)

(73) Assignee: BorgWarner Inc.

( * ) Notice: Subject to any disclaimer, the term of this patent is extended or adjusted under 35 U.S.C. 154(b) by 0 days.

(21) Appl. No.: 17/548,942

(22) Filed: Dec. 13, 2021

(65) Prior Publication Data

US 2023/0088559 A1  Mar. 23, 2023

(30) Foreign Application Priority Data

Sep. 22, 2021  (DE) .................. 10 2021 124 547.8

(51) Int. Cl.
*F01D 25/16* (2006.01)
*F02C 6/12* (2006.01)

(52) U.S. Cl.
CPC .............. *F01D 25/168* (2013.01); *F02C 6/12* (2013.01); *F05D 2220/40* (2013.01); *F05D 2240/52* (2013.01)

(58) Field of Classification Search
CPC ...... F01D 25/168; F02C 6/12; F05D 2220/40; F05D 2240/52
See application file for complete search history.

(56) References Cited

U.S. PATENT DOCUMENTS

| | | | |
|---|---|---|---|
| 5,567,129 A | 10/1996 | Bonardi | |
| 6,158,892 A | 12/2000 | Stewart et al. | |
| 2006/0245955 A1* | 11/2006 | Horiuchi | F04D 13/026 417/420 |
| 2011/0243762 A1 | 10/2011 | Daikoku et al. | |

FOREIGN PATENT DOCUMENTS

| | | | | |
|---|---|---|---|---|
| CN | 209569264 U | * | 11/2019 | |
| DE | 102015206816 A1 | | 10/2016 | |
| DE | 102017211962 A1 | | 1/2019 | |
| DE | 102018212570 A1 | * | 1/2020 | ........... F01D 25/168 |
| WO | WO-2004001090 A1 | * | 12/2003 | ............... C23C 4/06 |
| WO | 2015157052 A1 | | 10/2015 | |

OTHER PUBLICATIONS

German Office Action dated Jun. 7, 2022, in German Application No. 10 2021 124 547.8.
First Chinese Office Action (with English language translation) dated Jan. 19, 2022, in Chinese Application No. 202122421525.0.

\* cited by examiner

*Primary Examiner* — Jacob M Amick
*Assistant Examiner* — Charles J Brauch
(74) *Attorney, Agent, or Firm* — Eric L. Doyle; Stephan A. Pendorf; Patent Central LLC

(57) ABSTRACT

A supercharging device having a housing, at least one impeller, and at least one axial bearing having first and second bearing surfaces. The impeller here forms one of the bearing surfaces of the axial bearing.

15 Claims, 8 Drawing Sheets

SUPERCHARGING DEVICE

TECHNICAL FIELD

The present invention relates to a supercharging device having an axial bearing.

BACKGROUND

Ever-increasing numbers of vehicles of the newer generation are being equipped with supercharging devices in order to achieve the objectives in terms of requirements and satisfy legal regulations. In the development of supercharging devices, it is the aim to optimize the individual components and the system as a whole with regard to their reliability and efficiency.

Known supercharging devices in most instances have at least one compressor with a compressor wheel which is connected to a drive unit via a common shaft. The compressor compresses the fresh air that is drawn in for the internal combustion engine or for the fuel cell. In this way, the air or oxygen quantity that is available to the engine for combustion or to the fuel cell for reaction, respectively, is increased. This in turn leads to an increase in performance of the internal combustion engine, or of the fuel cell, respectively.

Supercharging devices may be equipped with different drive units. In particular, electric superchargers, in the case of which the compressor is driven by means of an electric motor, and exhaust turbochargers, in the case of which the compressor is driven by means of an exhaust turbine, are known in the prior art. Combinations of both drive units are also used. The system composed of the compressor wheel, the shaft and the drive unit in the prior art is typically mounted by radial and axial air bearings in a bearing housing. Known systems often lead to an increased requirement in terms of installation space as well as to limitations in terms of the design.

It is an object of the present invention to provide a supercharging device of a more compact construction.

SUMMARY OF THE INVENTION

The present invention relates to a supercharging device as claimed in claim 1.

The supercharging device comprises a housing, at least one impeller, and at least one axial bearing. The impeller here forms part of the axial bearing. In other words, this means that a functional part of the axial bearing is integrated in the impeller. This means that the impeller assumes part of the function of the axial bearing. Parts that are usually additionally required, such as an additional bearing disk that with the impeller sits on a common shaft, for example, can be dispensed with as a result. This results in a lower parts count and a reduced requirement in terms of installation space, in particular a reduced requirement in terms of installation space in the axial direction. This ultimately leads to a more compact supercharging device.

The axial bearing in design embodiments of the supercharging device can be an air bearing. In comparison to an oil-lubricated bearing, for example, an air bearing does not require any oil infeeds and does also not have to be completely sealed. An air bearing, thus also the axial bearing, can thus be more flexibly disposed in different regions of the supercharging device. The air mounting is advantageous in particular for the use with fuel cells, because the fuel cell must not be contaminated by foreign matter in order to exclude any risk of damage or failure. In the case of an oil-lubricated mounting, this could only be guaranteed by a perfect oil tightness, the latter if at all being able to be implemented only with great complexity. The air mounting thus also leads to a more reliable drive system, in particular when used with a fuel cell.

In design embodiments of the supercharging device that can be combined with the preceding design embodiment, the axial bearing in the axial direction can be configured between the impeller and the housing. The housing here can form part of the axial bearing. In other words, this means that a functional part of the axial bearing is integrated in the housing. This means that the housing assumes part of the function of the axial bearing. The housing as well as the impeller (see above) thus form part of the axial bearing.

In design embodiments of the supercharging device that can be combined with any of the preceding design embodiments, the axial bearing can comprise at least one corrugated film and/or at least one smooth film. Additionally, the corrugated film and the smooth film in the axial direction can be disposed so as to bear directly adjacently on one another. Alternatively or additionally, the corrugated film in the axial direction can be disposed so as to be directly adjacent to the housing. The smooth film in the axial direction here can be disposed so as to be adjacent to the impeller. Alternatively or additionally, the corrugated film can bear on the housing and be conceived for pretensioning the smooth film in the axial direction in relation to the impeller. As a result of these advantageous embodiments, a very narrow air gap can be generated between the impeller and the smooth film during the operation of the supercharging device, as a result of which a bearing effect between the impeller and the housing, or between the impeller and the smooth film, respectively, can be generated.

In design embodiments of the supercharging device that comprise at least one corrugated film and/or at least one smooth film, the corrugated film as a result of a movement of the smooth film in the axial direction can be conceived so as to be elastically compressible between the smooth film and the housing so that an air gap in the axial direction between the impeller and the smooth film is able to be configured during the operation. In other words, the smooth film can be disposed so as to bear directly on the impeller when the supercharging device is not in operation. As a result of a movement of the smooth film in the axial direction toward the corrugated film and toward the housing adjacent to the corrugated film during the operation, said movement being enabled by the elastic compressibility of the corrugated film, an air gap in the axial direction between the smooth film and the impeller can be configured. This air gap generates a bearing effect and leads to a very minor friction in comparison to a smooth film still bearing on the impeller or a roller bearing.

Alternatively or additionally, the corrugated film and/or the smooth film each can comprise at least one securing element. The securing element is conceived so as to be able to be brought to engage with a geometric element of the housing in order to secure the corrugated film and/or the smooth film against dislocations in the circumferential direction and/or dislocations in the radial direction. The securing element and/or the geometric element can in particular be configured as a recess and/or as an elevation of the corrugated film and/or of the smooth film, or of the housing, respectively. Alternatively or additionally, the respective securing element in the installed state can project from the corrugated film and/or the respective smooth film in the axial direction. The securing element can in particular be configured as a web-shaped elevation which extends in the radial direction and in the axial direction. Alternatively or additionally, the securing element can be configured as a pin-shaped elevation which extends largely in the axial direction. Alternatively or additionally, the corrugated film and/or the smooth film can be secured by the housing against dislocations in the radial direction. Alternatively or additionally, the securing element can be configured as a recess and the geometric element can be configured as an elevation, the latter being able to be brought to engage with the recess.

In design embodiments of the supercharging device that can be combined with any of the preceding design embodiments, the housing can comprise a stepped shoulder which is disposed on a face of the housing that in the axial direction faces the impeller. The stepped shoulder can extend in an annular manner about the axis of the impeller. The stepped shoulder here, radially outside an external circumference of the axial bearing, can project from the housing in the axial direction. Alternatively or additionally, the stepped shoulder, radially within an internal circumference of the axial bearing, can project from the housing in the axial direction. Alternatively or additionally, the housing can comprise a stepped shoulder which is disposed on a face of the housing that in the axial direction faces the impeller. The stepped shoulder can extend in an annular manner about the axis of the impeller. The stepped shoulder here, radially outside an external circumference of the corrugated film and/or radially outside an external circumference of the smooth film, can project from the housing in the axial direction. Alternatively or additionally, the stepped shoulder, radially within an internal circumference of the corrugated film and/or radially within an internal circumference of the smooth film, can project from the housing in the axial direction. The stepped shoulder provides a possibility for securing the axial bearing, or the bearing films, respectively, against dislocations in the circumferential direction and/or in the radial direction, on the one hand. On the other hand, a gap in the axial direction between the impeller and the housing, radially within and/or radially outside the axial bearing and/or the bearing films, can be reduced as a result. As a result of the stepped shoulder projecting in the axial direction toward the impeller, a flow of air on or below the corrugated foil can in particular be reduced or prevented. It can thus be ensured that a majority of the bearing air flows axially between the smooth film and the impeller during the operation. The functionality of the axial bearing can be improved as a result.

In design embodiments of the supercharging device that can be combined with any of the preceding design embodiments, the housing can comprise a depression which is configured in the axial direction and on a face of the housing that in the axial direction faces the impeller extends in an annular manner about the axis of the impeller. The depression here can be conceived for receiving the axial bearing, or for forming part of the latter, respectively. In other words, the axial bearing can be secured by the depression against dislocations, or be inserted into the depression, respectively. Alternatively or additionally, the housing can comprise a depression which is configured in the axial direction and on a face of the housing that in the axial direction faces the impeller extends in an annular manner about the axis of the impeller. The depression here can be conceived for receiving the corrugated film and/or the smooth film. An axial space for the bearing films can be provided as a result of these advantageous design embodiments. The dimensions of the supercharging device in the axial direction can thus be reduced. As has already been mentioned above in the context of the stepped shoulder, a gap can furthermore be reduced and thus the sealing of the axial bearing against undesirable air flows can be improved. During the operation, air flows can flow, or be directed, respectively, in a targeted manner into the desired regions, in particular axially between the smooth film and the impeller, as a result. The functionality of the axial bearing can be improved as a result.

In design embodiments of the supercharging device that can be combined with any of the preceding design embodiments, the axial bearing can be configured so as to be annular.

In design embodiments of the supercharging device that can be combined with any of the preceding design embodiments, the corrugated film and/or the smooth film can be configured in the manner of annular segments.

In design embodiments of the supercharging device that can be combined with any of the preceding design embodiments, the impeller can comprise an impeller rear wall. The axial bearing in the axial direction here can be configured between the impeller rear wall and the housing. The impeller rear wall here can form part of the axial bearing. Alternatively or additionally, the axial bearing in the axial direction can be configured between the impeller rear wall and an impeller housing rear wall of the housing. The impeller housing rear wall here can form part of the axial bearing. Alternatively or additionally, the impeller housing rear wall can be formed so as to be integral to a bearing housing of the housing. This means that the impeller rear wall and/or the impeller housing rear wall assume(s) part of the function of the axial bearing. The housing, or the impeller housing rear wall, respectively, as well as the impeller, or the impeller rear wall, respectively, (see above) thus form part of the axial bearing. Parts that are usually additionally required, such as an additional bearing disk that with the impeller sits on a common shaft, for example, can be dispensed with as a result. This means that the axial bearing can in part be formed by parts that are already present in a supercharging device. This results in a lower parts count and a reduced requirement in terms of installation space, in particular a reduced requirement in terms of installation space in the axial direction. This ultimately leads to a more compact supercharging device.

In design embodiments of the supercharging device that can be combined with any of the preceding design embodiments, the axial bearing can be configured with a rectilinear cross section. Alternatively or additionally, the impeller rear wall, the corrugated film, the smooth film and/or the impeller housing rear wall can be configured with a (substantially) rectilinear cross section.

In design embodiments of the supercharging device in which the impeller comprises an impeller rear wall, the impeller can comprise a cover element. The cover element in the axial direction here can be disposed on the impeller so as to be opposite the impeller rear wall and be connected in a rotationally fixed manner to the impeller. Alternatively or additionally, the cover element can extend in an annular manner about the axis of the impeller. The cover element can additionally comprise a circular central opening. Alternatively or additionally, the cover element can be formed so as to be integral to the impeller.

In design embodiments of the supercharging device in which the impeller comprises a cover element, the axial bearing in the axial direction can be configured between the cover element and the housing. The cover element here can form part of the axial bearing. Alternatively or additionally, the axial bearing in the axial direction can be configured between the cover element and an impeller housing wall of an impeller housing of the housing. The impeller housing wall here can form part of the axial bearing. Alternatively or additionally, the impeller housing wall can comprise a face that in the axial direction and/or in the radial direction faces the cover element and extends in an annular manner about the axis of the impeller. The face of the impeller housing wall here can form part of the axial bearing. This means that the cover element and/or the impeller housing wall, or the face thereof, assume(s) part of the function of the axial bearing. The housing, or the impeller housing wall, respectively, or the face thereof, respectively, as well as the impeller, or the cover element, respectively, (see above) thus form part of the axial bearing. Parts that are usually additionally required, such as an additional bearing disk that with the impeller sits on a common shaft, for example, can be dispensed with as a result. This means that the axial bearing can in part be formed by parts that are already present in a supercharging device. The cover element on the external geometry of the impeller blades that lies in the axial direction here can be configured so as to be thin. The cover element can furthermore follow the contours of the impeller blades. If at all, only a minimal additional space in the axial direction is thus required for the cover element. As has already been mentioned, the cover element can also be manufactured so as to be integral to the impeller. This results in a lower parts count and a reduced requirement in terms of installation space, in particular a reduced requirement in terms of installation space in the axial direction. This ultimately leads to a more compact supercharging device.

In design embodiments of the supercharging device in which the impeller comprises a cover element, the axial bearing can be configured with a rectilinear cross section. Alternatively or additionally, the cover element, the corrugated film, the smooth film and the impeller housing wall and/or the face can be configured with a (substantially) rectilinear cross section.

Alternatively, the axial bearing can be configured with a curved cross section. Alternatively or additionally, the cover element, the corrugated film, the smooth film and/or the impeller housing wall, or the face of the impeller housing wall, respectively, can be configured with a curved cross section.

In design embodiments of the supercharging device that can be combined with any of the preceding design embodiments, the supercharging device can comprise a first axial bearing and a second axial bearing. Additionally, the first axial bearing can be configured according to any of the preceding design embodiments in which the axial bearing in the axial direction is configured between the impeller rear wall and the housing. The second axial bearing here can be configured according to any of the preceding design embodiments in which the axial bearing in the axial direction is configured between the cover element and the housing.

In design embodiments of the supercharging device that can be combined with any of the preceding design embodiments, at least the parts of the impeller that form part of the axial bearing can have a coating. In design embodiments of the supercharging device that have a cover element, at least the parts of the cover element that form part of the axial bearing can have a coating. The coating can comprise at least one of DLC (diamond-like carbon), titanium nitride, chromium nitride and/or chromium carbon nitride. The coating on the impeller and/or on the cover element has the advantage that said coating hardens the surface of the corresponding component and/or reduces the coefficient of friction in these surface regions. The coating in an advantageous manner thus acts as a protective layer against wear, on the one hand, and can minimize friction, in particular when accelerating the supercharging device, on the other hand.

In design embodiments of the supercharging device that can be combined with any of the preceding design embodiments, the supercharging device can comprise a first impeller, a second impeller and a shaft. The first impeller and the second impeller here can each be attached in a rotationally fixed manner at one end of the shaft and by way of the shaft be connected in a rotational manner to one another.

In design embodiments of the supercharging device in which the supercharging device comprises a first axial bearing and a second axial bearing, said design embodiments being able to be combined with the preceding design embodiment, the first impeller can be part of the first axial bearing. The first axial bearing here can be configured according to any of the preceding design embodiments in which the axial bearing in the axial direction is configured between the impeller rear wall and the housing.

In design embodiments of the supercharging device that can be combined with the preceding design embodiment, the first impeller can be part of the second axial bearing. The second axial bearing here can be configured according to any of the preceding design embodiments in which the axial bearing in the axial direction is configured between the cover element and the housing.

Alternatively, the second impeller can be part of the second axial bearing. The second axial bearing here can be configured according to any of the preceding design embodiments in which the axial bearing in the axial direction is configured between the impeller rear wall and the housing. Alternatively, the second axial bearing can be configured according to any of the preceding design embodiments in which the axial bearing in the axial direction is configured between the cover element and the housing.

In alternative design embodiments of the supercharging device in which the supercharging device comprises a first axial bearing, a second axial bearing, a first impeller, a second impeller and a shaft, the first impeller can be part of the first axial bearing. The first axial bearing here can be configured according to any of the preceding design embodiments in which the axial bearing in the axial direction is configured between the cover element and the housing.

In design embodiments of the supercharging device that can be combined with the preceding design embodiment, the second impeller can be part of the second axial bearing. The second axial bearing here can be configured according to any of the preceding design embodiments in which the axial bearing in the axial direction is configured between the impeller rear wall and the housing. Alternatively, the second axial bearing can be configured according to any of the preceding design embodiments in which the axial bearing in the axial direction is configured between the cover element and the housing.

In alternative design embodiments of the supercharging device in which the supercharging device comprises a first axial bearing, a second axial bearing, a first impeller, a second impeller and a shaft, the second impeller can be part of the first axial bearing and part of the second axial bearing. The first axial bearing here can be configured according to any of the preceding design embodiments in which the axial bearing in the axial direction is configured between the impeller rear wall and the housing. Furthermore, the second axial bearing can be configured according to any of the preceding design embodiments in which the axial bearing in the axial direction is configured between the cover element and the housing.

In design embodiments of the supercharging device that can be combined with any of the preceding design embodiments, the impeller can be a compressor wheel or a turbine wheel.

In design embodiments of the supercharging device in which the supercharging device comprises a first impeller, a second impeller and a shaft, the first impeller can be a compressor wheel, and the second impeller can be a turbine wheel. Alternatively, the first impeller can be a turbine wheel and the second impeller can be a compressor wheel. Alternatively, the first impeller and the second impeller can be compressor wheels. In the latter case, the two compressor wheels can be coupled to one another in such a manner that said compressor wheels conjointly form a dual-stage compressor system.

In design embodiments of the supercharging device that can be combined with any of the preceding design embodiments, the housing can comprise a first impeller housing and a second impeller housing. The first impeller housing here can be a compressor housing, and the second impeller housing can be a turbine housing. Alternatively, the first impeller housing can be a turbine housing, and the second impeller housing can be a compressor housing. Alternatively, the first impeller housing and the second impeller housing can be compressor housings.

DETAILED DESCRIPTION

In the context of this application, the terms axial and axial direction refer to an axis of the impeller, or of the axial bearing, respectively. With reference to the figures (see FIG. 1 or FIG. 2, for example), the axial direction is illustrated by the reference sign 22. A radial direction 24 here relates to the axis of the impeller, or of the axial bearing, respectively. Likewise, a circumference or a circumferential direction 26 relates to the axis of the impeller, or of the axial bearing, respectively.

Figure 1:
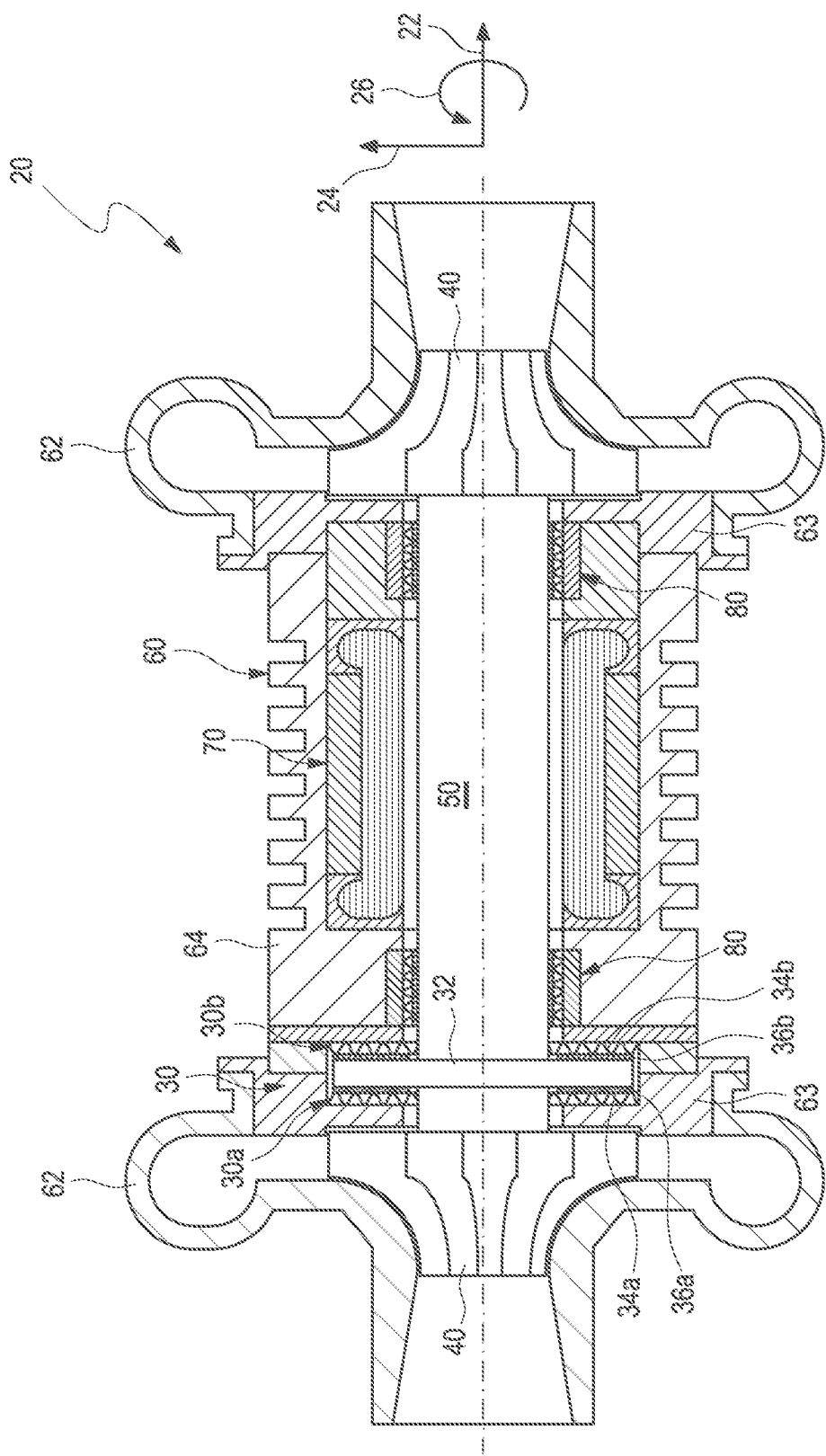
FIG. 1 shows a lateral sectional view of a supercharging device having a known axial bearing.

FIG. 1 shows a known supercharging device 20 having two impellers 40 and an electric motor 70. The exemplary known supercharging device 20 here (as has already been mentioned above) is driven by an electric motor 70 and a turbine wheel 40 (one of the two impellers 40). The further impeller 40 here represents a compressor wheel 40 which by way of the shaft 50 is connected in a rotationally fixed manner to the electric motor 70 and the turbine wheel 40, and can be driven by said electric motor 70 and said turbine wheel 40. The turbine wheel 40 illustrated here is intended to represent only a schematic illustration. The geometric conditions may be configured differently from those illustrated in the figures here. In particular, the ratio of the external wheel diameter to the internal wheel diameter of the turbine wheel 40 can be smaller than illustrated here. The turbine wheel 40 illustrated here can also be a second compressor wheel 40. In this case, both compressor wheels 40 are driven by the electric motor 70. The two compressor wheels 40 here can be coupled to one another in such a manner that said compressor wheels 40 conjointly form a dual-stage compressor system. The impellers 40, the shaft 50 and the electric motor 70 are surrounded by a housing 60 of the supercharging device 20. The housing 60 comprises two impeller housings 62 (for example a compressor housing and a turbine housing, or alternatively two compressor housings) each having an impeller housing rear wall 63 as well as a bearing housing 64 which in the axial direction 22 is disposed between the two impeller housings 62. The system composed of the shaft 50 and the impellers 40 is mounted in the housing 60 by way of known axial and radial bearing systems in the region of the bearing housing 64. The radial bearing system comprises two radial bearings 80 which in the axial direction 22 are disposed to the left and to the right of the electric motor 70, so as to be lateral to the latter, in recesses of the bearing housing 64 between the shaft 50 and the bearing housing 64. The axial bearing system here comprises two axial bearings 30a, 30b, which are disposed on both sides of a bearing disk 32 that sits on the shaft 50, so as to be to the right and to the left of said bearing disk 32 in the axial direction 22. The bearing disk 32 in the axial direction 22 here sits between one of the two impeller housing rear walls 63 and a face of the bearing housing 64 that in the axial direction 22 is directed toward the respective impeller housing rear wall 63. The two axial bearings 30a, 30b in the axial direction 22 here are configured between the bearing disk 32 and the impeller housing rear wall 63, or in the axial direction 22 between the bearing disk 32 and the face of the bearing housing 64 that in the axial direction 22 is directed toward the respective impeller housing rear wall 63. Accordingly, the axial bearing system and the axial bearings 30a, 30b are situated outside the impeller housing 62. The axial bearings 30a, 30b each comprise at least two bearing films 34a/34b, 36a/36b, of which at least one bearing film is in each case a corrugated film 34a, 34b, and at least one other bearing film is in each case a smooth film 36a, 36b.

Figure 2:
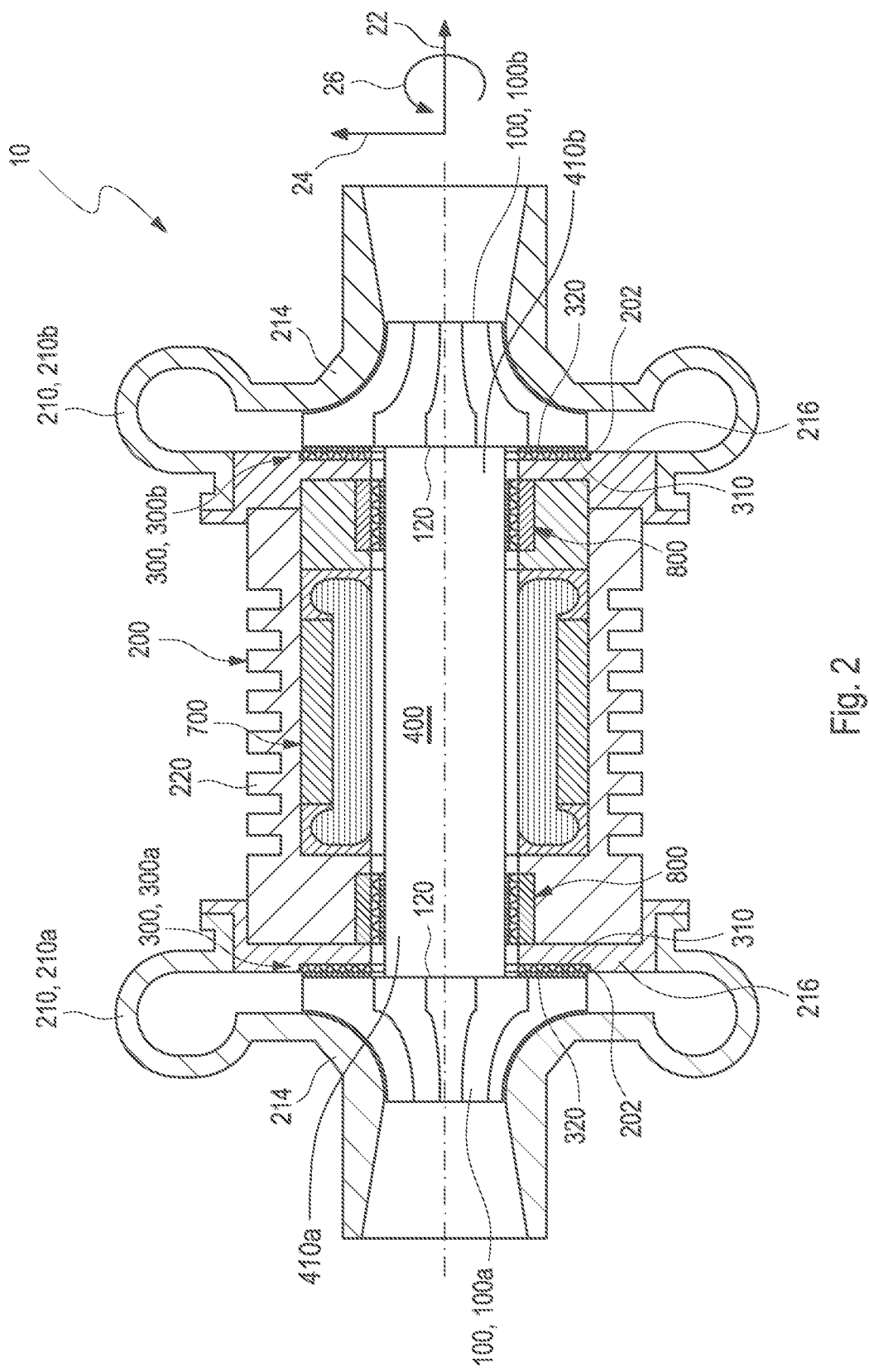
FIG. 2 shows a lateral sectional view of the supercharging device according to the invention having an axial bearing in a first embodiment.

In contrast, FIG. 2 shows a supercharging device 10 according to the invention in a first embodiment. In a manner analogous to that of the supercharging device from FIG. 1, the exemplary embodiment of the supercharging device 10 according to the invention from FIG. 2 has similar components and elements which, while potentially being of identical embodiment in part, have other reference signs in order to be more clearly differentiated. However, in FIGS. 3A to 5F which like FIG. 2 show design embodiments of the supercharging device 10 according to the invention, identical features are provided with the same reference signs as in FIG. 2.

The supercharging device 10 comprises two impellers 100 and an electric motor 700. The electric motor 700 and a first impeller 100a, 100b here serve for driving the other second impeller 100a, 100b, the latter by way of a shaft 400 being connected to the electric motor 700 and/or to the first impeller 100a, 100b. In alternative design embodiments, the supercharging device 10 can however also comprise only at least one impeller 100. The supercharging device 10 may also not comprise any electric motor 700. In the latter case, the second impeller 100a, 100b is driven only by the first impeller 100a, 100b.

The supercharging device 10 likewise comprises a housing 200. The housing 200 comprises two impeller housings 210 (for example a compressor housing 210a and a turbine housing 210b, or alternatively two compressor housings 210a, 210b) each having an impeller housing rear wall 216 as well as a motor housing or bearing housing 220 which in the axial direction 22 is disposed between the two impeller housings 210. The impeller housing rear wall 216 in the axial direction 22 here is disposed between the respective impeller housing 210 and the bearing housing 220. Or else, the impeller housing rear wall 216 in the axial direction 22 can also be disposed so as to be partially or completely within the impeller housing 210. The term impeller housing rear wall 216 is intended to describe a rear wall of the impeller housing 210 that on or in the impeller housing 210 is disposed proximal to the shaft and closes off said impeller housing 210 in the axial direction 22. "Proximal to the shaft" here is intended in particular to describe a side of the impeller housing 210 which, depending on the type of the impeller, in the axial direction 22 relative to the impeller 100 is opposite the inlet of the impeller 100 in the case of a compressor, and is opposite the outlet of the impeller 100 in the case of a turbine. In alternative design embodiments, in particular those in which the supercharging device 10 comprises only one impeller 100, the supercharging device 10 can also comprise only one impeller housing 210. The impeller housing rear wall 216 in alternative design embodiments can also be formed so as to be integral to the bearing housing 220. The impeller housing rear wall 216 can be conceived for securing the radial bearing 80 in the axial direction 22. In design embodiments in which the supercharging device 10 comprises two impellers 100, two impeller housings 210 and two impeller housing rear walls 216, the one impeller housing rear wall 210 of the first impeller housing 210a, in the region of a first axial end 410a, can be conceived for securing the radial bearing 80 in the axial direction 22. The other impeller housing rear wall 210 of the second impeller housing 210b, in the region of a second axial end 410b, here can be conceived for securing the radial bearing 80 in the axial direction 22 (see FIG. 2, for example).

The supercharging device 10 according to the invention also has axial bearing systems and radial bearing systems. However, the supercharging device 10 according to the invention in comparison to a known supercharging device 20 from FIG. 1 comprises at least one axial bearing 300 of which part is formed by the impeller 100. In other words, this means that part of the function of the axial bearing 300 is integrated in the impeller 100. This means that the impeller 100 assumes part of the function of the axial bearing 300. Parts that are usually additionally required, such as the additional bearing disk 32 of the known supercharging device 20 from FIG. 1 that sits on the shaft 50, for example, can thus be dispensed with. This results in a lower parts count and a reduced requirement in terms of installation space. This results in particular in a reduced requirement in terms of installation space in the axial direction 22, this becoming obvious when comparing FIGS. 1 and 2. This ultimately leads to a more compact supercharging device 10.

The axial bearings 300 in the embodiments of the supercharging devices 10 illustrated in the figures are air bearings. However, other suitable types of bearings could also be used in alternative design embodiments. In comparison to an oil-lubricated bearing, for example, an air bearing does not require any oil infeeds and also does not have to be sealed to the same degree. An air bearing, thus also the axial bearing 300, can thus be more flexibly disposed in different regions of the supercharging device 10. The air mounting is advantageous in particular for the use with fuel cells 3, because the fuel cell 3 must not be contaminated by foreign matter in order to exclude any risk of damage or failure. In the case of an oil-lubricated mounting, this could only be guaranteed by a perfect oil tightness, the latter if at all being able to be implemented only with great complexity. The air mounting thus also leads to a more reliable drive system, in particular when used with a fuel cell 3.

The axial bearings 300 illustrated in the figures are bearings of a single-sided embodiment, that is to say that the axial bearings 300 can absorb forces in only one axial direction 22. However, the axial bearings 300 in alternative design embodiments can also be of a double-sided embodiment, thus be bearings that can absorb forces in both axial directions 22. The fundamentals pertaining to the design embodiment of single-sided and double-sided axial bearings are known.

The axial bearing 300 in the axial direction 22 is configured between the impeller 100 and the housing 200. The housing 200 here forms part of the axial bearing 300 (see FIGS. 2 and 3A, for example). In other words, this means that a functional part of the axial bearing 300 is integrated in the housing 200. This means that the housing 200 assumes part of the function of the axial bearing 300. The housing 200 as well as the impeller 100 (see above) thus form part of the axial bearing 300.

Figure 3A:
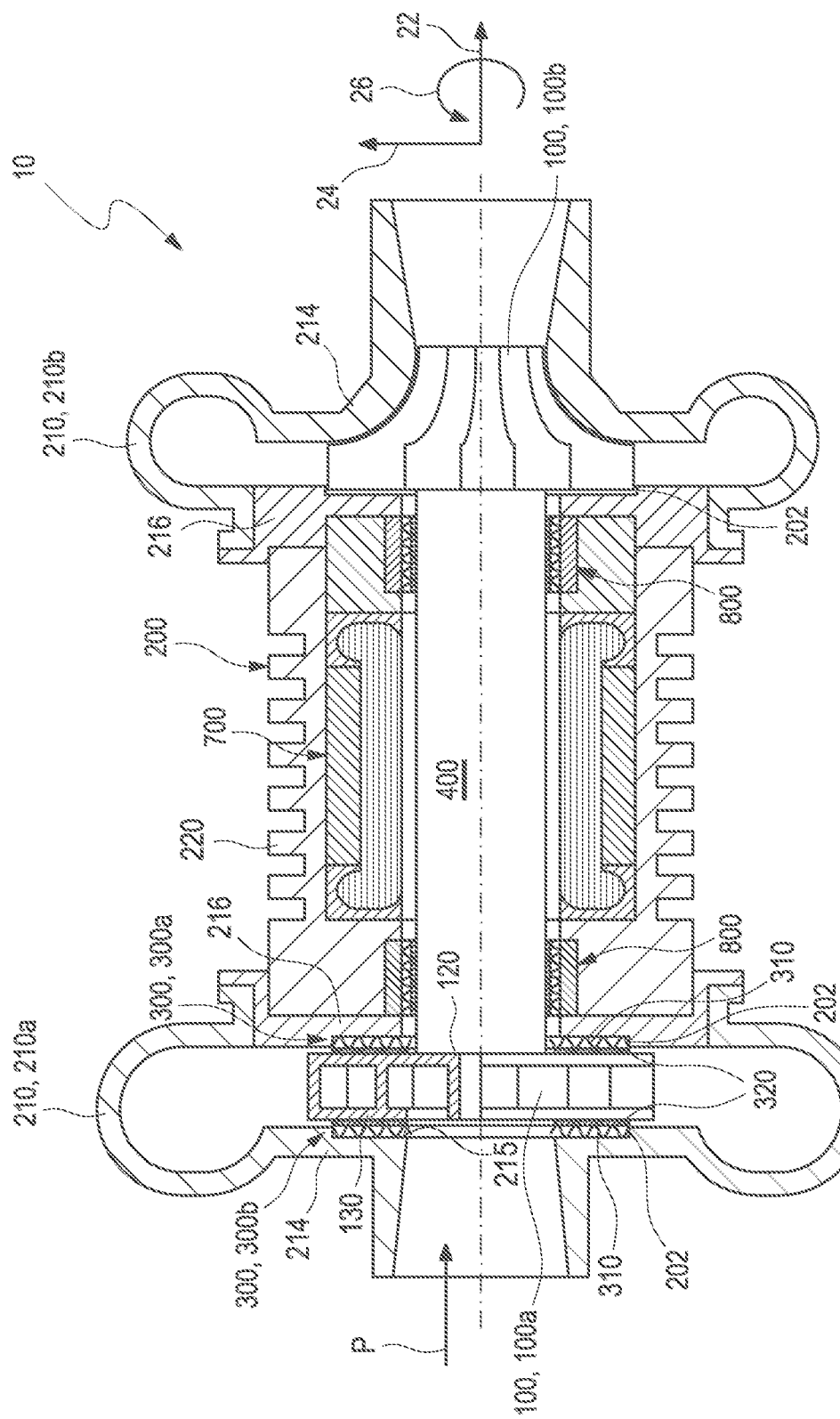
FIG. 3A shows a lateral sectional view of the supercharging device according to the invention having an axial bearing in a second embodiment, having a 2D impeller.

In a manner similar to the supercharging device 20 of FIG. 1, the axial bearing 300 of the supercharging device 10 according to the invention comprises at least one corrugated film 310 and at least one smooth film 320 (see FIGS. 2 and 3A). The corrugated film 310 and/or the smooth film 320 can generally also be referred to as bearing films 310, 320. The corrugated film 310 and the smooth film 320 in the axial direction 22 here are disposed so as to bear directly adjacently on one another. The corrugated film 310 in the axial direction 22 is disposed so as to be directly adjacent to the housing 200. The smooth film 320 in the axial direction 22 here is disposed so as to be adjacent to the impeller 100. The impeller 100, the smooth film 320, the corrugated film 310 and the housing 200 in the axial direction 22 are thus disposed so as to be next to one another. The impeller 100, the smooth film 320, the corrugated film 310 and the housing 200 conjointly thus form the axial bearing 300 (see in particular FIGS. 2 and 3A). The corrugated film 310 bears on the housing 200. The corrugated film 310 is conceived for pretensioning the smooth film 320 in the axial direction 22 in relation to the impeller 100, or pretensioning said smooth film 320 in the direction of the impeller 100, respectively. The corrugated film 310 here is conceived so as to be compressible in the axial direction 22. This means that the corrugated film 310, as a result of a movement of the smooth film 320 in the axial direction 22 toward the corrugated film 310, is elastically compressible in the axial direction 22 between the smooth film 320 and the housing 200 so that a very narrow air gap in the axial direction 22 between the impeller 100 and the smooth film 320 is able to be configured during the operation. As a result, a bearing effect between the impeller 100 and the housing 200, or between the impeller 100 and the smooth film 320, respectively, can be generated.

The impeller 100 thus forms a first bearing face of the axial bearing 300 that is oriented in the direction of the smooth film 320, and the smooth film 320 forms a second bearing face of the axial bearing 300 that is oriented in the direction of the impeller 100. When the supercharging device 10 is out of operation, thus when the impeller 100 does not rotate, the smooth film 320 bears on the impeller 100 (see FIG. 2, for example). In other words, the first bearing face of the axial bearing 300 bears on the second bearing face of the axial bearing 300. When the supercharging device 10 is put in operation, the impeller 100 begins to rotate, and a relative movement in the circumferential direction 26 is created between the impeller 100 and the smooth film 320. As a result, air flows axially between the smooth film 320 and the impeller 100 and exerts an axial force on the impeller 100 and the smooth film 320. As a result, an air gap is created between the impeller 100 and the smooth film 320, as a result of which a bearing effect is achieved. This means that an air gap is created in the axial direction 22 between the first bearing face of the axial bearing 300 and the second bearing face of the axial bearing 300. As a result of the compressibility of the corrugated film 310, the smooth film 320 in the axial direction 22 can move toward the corrugated film 310 and press the latter against the housing 200. The housing 200 thus serves inter alia as a fixed bearing. The corrugated film 310 is thus (elastically) compressed between the smooth film 320 and the housing 200. For this reason inter alia, the corrugated film 310 can also be referred to as a spring element 310 or a spring film 310, and the smooth film 320 can also be referred to as a bearing face film 320. In other words, the smooth film 320 can be disposed so as to bear directly on the impeller 100 when the supercharging device 10 is not in operation. As a result of a movement of the smooth film 320 in the axial direction 22 toward the corrugated film 310 and toward the housing 200 that is adjacent to the corrugated film 310, an air gap in the axial direction 22 between the smooth film 320 and the impeller 100 can be configured during the operation. This air gap generates a bearing effect and leads to a very minor friction in comparison to a smooth film 310 still bearing on the impeller 100 or a roller bearing.

It is to be noted at this point that the figures represent only schematic illustrations of the supercharging device 10 according to the invention. For example, the profile of the corrugations of the corrugated film 310 in FIG. 3A is preferably in the circumferential direction 26 and not in the radial direction 24 as illustrated.

Figure 5A:
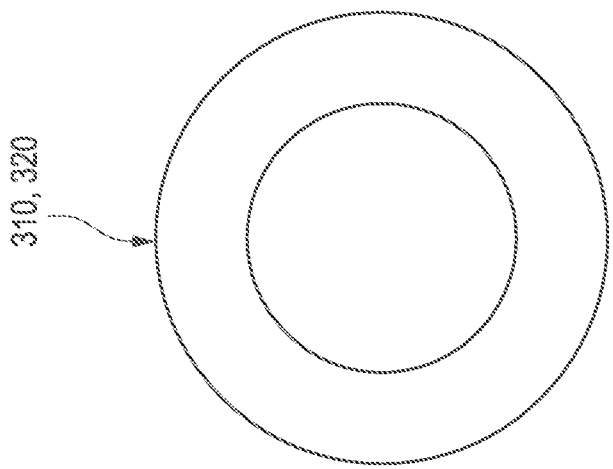
FIGS. 5A-5F show schematic illustrations of different design embodiments of the bearing films and fastening elements, or dislocation safeguards, respectively.
Figure 5B:
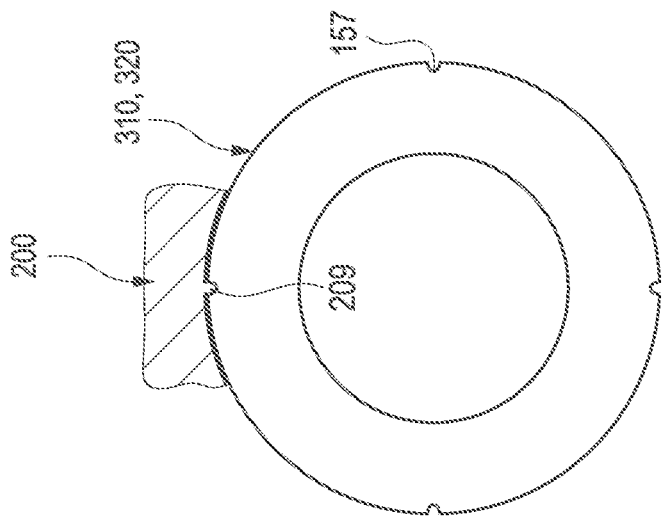
Figure 5C:
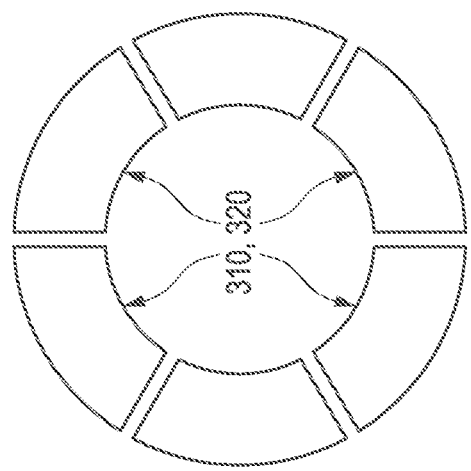

In particular with reference to FIG. 4B it can be seen that the corrugated film 310 and/or the smooth film 320 each comprise at least one securing element 159. The securing element 159 is conceived so as to be able to be brought to engage with a geometric element 207 of the housing 200 in order to secure the corrugated film 310 and/or the smooth film 320 against dislocations in the circumferential direction 26 and/or dislocations in the radial direction 24. In the embodiment of FIG. 4B the smooth film 320 has a securing element 159 which in an exemplary manner is designed as a pin-shaped elevation 159. The geometric element 207 is designed as a depression 207 corresponding to the pin-shaped elevation 159, the latter being able to be inserted into said depression 207. In the example of FIG. 4B only the smooth film 320 has a securing element 159 which secures the smooth film 320 as well as the corrugated film 310 against dislocations in the circumferential direction 26 and dislocations in the radial direction 24. This is possible by a bore in the axial direction 22 of the corrugated film 310, for example, the pin-shaped elevation 159 of the smooth film 320 being guided through said bore. In alternative design embodiments, however, both bearing films 310, 320, or only the corrugated film 310, can also comprise a securing element 157, 159. Furthermore, in the example of FIG. 4B, the pin-shaped elevation 159 and the depression 207 extend substantially in the axial direction 22. In other embodiments, the securing element 157, 159 and the geometric element 207, 209 can also extend in other directions. In the example of FIG. 5B the geometric element 209 of the housing 200, the former here being configured as a radial elevation 209, in the radial direction 24 engages in a securing element 157 of the corrugated film 310 and/or of the smooth film 320, wherein the securing element 157 in this example is configured as a recess 157. The securing element 157 and/or the geometric element 209 can in particular be configured as a recess 157, 207 and/or as an elevation 159, 209 of the corrugated film 310 and/or of the smooth film 320, or of the housing 200, respectively. Here, either the securing element 157, 159 or the geometric element 207, 209 is in each case configured as a recess 157, 207, and the respective other element is configured as an elevation 159, 209. In alternative design embodiments, the securing element 157, 159 can in particular be configured as a web-shaped elevation 159. The web-shaped elevation 159 here can in particular extend in the radial direction 24 and in the axial direction 22.

In the exemplary embodiments of the supercharging devices 10 from FIGS. 2 and 3A, the housing 200 comprises a stepped shoulder 202. The stepped shoulder 202 is disposed on a face of the housing 200 that in the axial direction 22 faces the impeller 100. The stepped shoulder 202 extends in an annular manner about the axis of the impeller 100. The stepped shoulder 202 here, radially outside an external circumference of the axial bearing 300, projects from the housing 200 in the axial direction 22. More specifically, the stepped shoulder 202 can form part of the housing 200 which forms the axial bearing 300. This means that the stepped shoulder 202 can form part of the axial bearing 300 and delimit the latter in the radial direction 24. The stepped shoulder 202, radially outside an external circumference of the bearing films 310, 320, thus of the corrugated film 310 and/or of the smooth film 320, here projects from the housing 200 in the axial direction 22. In alternative design embodiments, the stepped shoulder 202, radially within an internal circumference of the axial bearing 300, can also project from the housing 200 in the axial direction 22. The stepped shoulder 202 radially within an internal circumference of the bearing films 310, 320, thus of the corrugated film 310 and/or of the smooth film 320, can thus project from the housing 200 in the axial direction 22. In the exemplary embodiment of FIGS. 4A and 4B the housing 200 comprises a radially inner as well as a radially outer stepped shoulder 202. In a further exemplary embodiment, the housing 200 does not comprise any stepped shoulder 202 at all (see FIG. 3B). This is not intended to represent any limitation in terms of the respective combination of embodiments but simply visualize some variants of the different design embodiments. For example, the housing 200 in FIG. 3B could also comprise a radially inner and/or a radially outer stepped shoulder 202. The stepped shoulder 202 provides a possibility for securing the axial bearing 300, or the bearing films 310, 320, respectively, against dislocations in the circumferential direction 26 and/or in the radial direction 24, on the one hand. On the other hand, a gap in the axial direction 22 between the impeller 100 and the housing 200, radially within and/or radially outside the axial bearing 300 and/or the bearing films 310, 320, can be reduced as a result. As a result of the stepped shoulder 202 projecting in the axial direction 22 toward the impeller, a flow of air on or below the corrugated film 310 can in particular be reduced or prevented because the stepped shoulder 202 as a result of the axial extent of the latter partially or completely covers the corrugated film 310, when viewed in the radial direction 24. It can thus be ensured that a majority of the bearing air flows between the smooth film 320 and the impeller 100 during the operation. The functionality of the axial bearing 300 can be improved as a result.

As can be seen in particular in the embodiments of FIG. 4A, the housing 200 can comprise a depression 204 which is configured in the axial direction 22 and on a face of the housing 200 that in the axial direction 22 faces the impeller 100 extends in an annular manner about the axis of the impeller 100. Two stepped shoulders 202 are likewise formed as a result. The depression 204 here is configured for receiving the axial bearing 300, or the bearing films 310, 320, thus the corrugated film 310 and/or the smooth film 320, respectively. This means that the depression 204 can form part of the axial bearing 300 and delimit the latter in the radial direction 24. The depression 204 can thus delimit the axial bearing 300, or the bearing films 310, 320, thus the corrugated film 310 and/or the smooth film 320, respectively, in the radial direction 24. In other words, the axial bearing 300 can be secured by the depression 204 against dislocations, or be inserted into the depression 204, respectively. An axial space for the bearing films 310, 320 can be provided as a result of the depression 204. The dimensions of the supercharging device 10 in the axial direction 22 can thus be reduced. Furthermore, as has already been discussed above in the context of the stepped shoulder 202, a gap, in particular in the axial direction 22, between the impeller 100 and the housing 200, radially within and radially outside the axial bearing 300, or the bearing films 310, 320, respectively, can be reduced and thus the sealing of the axial bearing 300 against undesirable air flows can be improved. This means that during the operation, air flows can flow, or be directed, respectively, in a targeted manner into the desired regions, in particular between the smooth film 320 and the impeller 100. The functionality of the axial bearing 300 can be improved as a result.

Figure 5F:
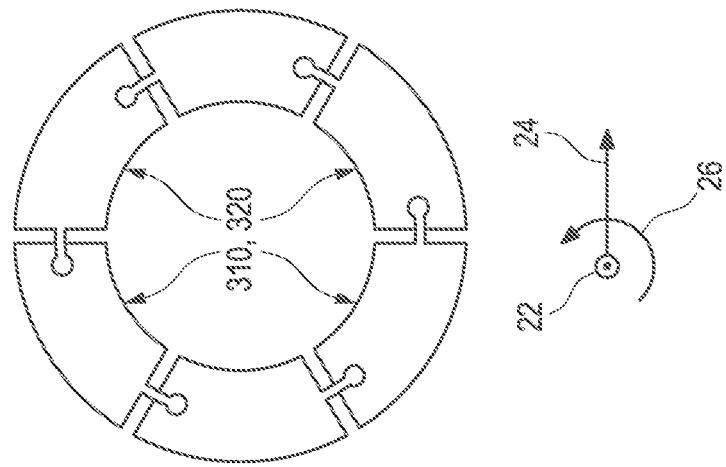
Figure 5E:
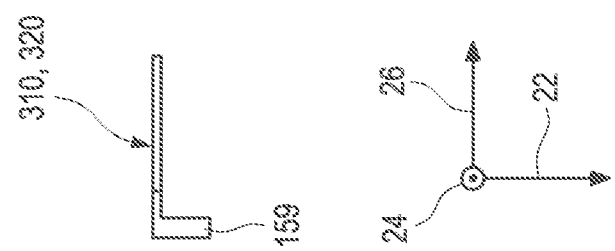
Figure 5D:
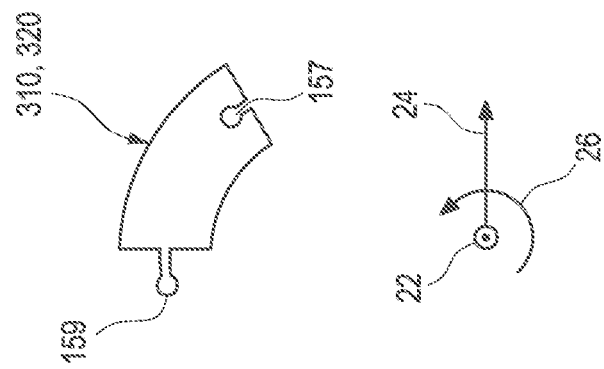

FIGS. 5A to 5F show various design embodiments of the bearing films 310, 320. As has already been mentioned, the axial bearing 300 in principle comprises at least one corrugated film 310 and at least one smooth film 320. In alternative embodiments, the corrugated film 310 could also be replaced by an element of similar function. As is depicted in the exemplary embodiment of FIGS. 5C and 5F, the axial bearing 300 can however also comprise a larger number of bearing films 310, 320. Six smooth films 320 are schematically depicted in this example. The schematic images of FIGS. 5C and 5F could however also represent six corrugated films 310 which are configured in a manner analogous to that of the smooth films 320. In an example of this type, the axial bearing 300 thus comprises six smooth films 320 and six corrugated films 310. In alternative design embodiments, there can also be a higher or lower number of smooth films 320 and/or corrugated films 310. In alternative design embodiments, the number of smooth films 320 and the number of corrugated films 310 could also be different from one another. The axial bearing 300 extends in the circumferential direction 26 about the axis of the impeller 100. The axial bearing 300 in principle is thus configured so as to be annular. Accordingly, the bearing films 310, 320 also extend in the circumferential direction 26 about the axis of the impeller 100, or are configured so as to be annular, respectively. This can be readily seen in the examples of FIGS. 5A and 5B, for example, in which the bearing films 310, 320 represent a closed ring. Bearing films 310, 320 of this type are preferably used only in axial bearings 300 that each comprise only one smooth film 320 and one corrugated film 310. Alternatively, the bearing films 310, 320 can also have an interruption in the circumferential direction 26 and accordingly not form a closed ring. This is the case in particular in axial bearings 300 that each comprise more than one smooth film 320 and/or more than one corrugated film 310. In design embodiments of this type, the bearing films 310, 320 are configured in the manner of annular segments (see FIGS. 5C and 5F, for example). The bearing films 310, 320 as annular segments can thus conjointly form a substantially annular axial bearing 300. As is shown in FIGS. 5D and 5F, the plurality of bearing films 310, 320 can be secured not only in the housing 200 but also in relation to one another by the securing element 157, 159. For example, an elevation 159 that in the circumferential direction 26 extends from a bearing film 310, 320 here can engage in a correspondingly shaped recess 157 that in the circumferential direction 26 extends into an adjacent bearing film 310, 320 (see FIGS. 5D and 5F). The just mentioned elevation 159 in at least one portion can likewise extend in the axial direction 22 and thus be able to be brought to engage with a depression 207 of the housing 200, as is the case with the pin-shaped elevation 159 mentioned further above.

As can be seen in particular in FIG. 2 or 3A, the impeller 100 comprises an impeller rear wall 120. The term impeller rear wall 120 is intended to describe a rear wall of the impeller 100 that on the impeller 100 is disposed proximal to the shaft and closes off said impeller 100 in the axial direction 22. "Proximal to the shaft" here is intended (analogously to the description above) in particular to describe a side of the impeller 100 which, depending on the type of the impeller 100, in the axial direction 22 relative to the impeller 100 is opposite the inlet of the impeller 100 in the case of a compressor, and is opposite the outlet of the impeller 100 in the case of a turbine. In alternative design embodiments, in particular those in which the supercharging device 10 comprises only one impeller 100, the supercharging device 10 can also comprise only one impeller housing 210.

In a first embodiment of the supercharging device 10, or of the axial bearing 300, respectively (see FIG. 2, for example), the axial bearing 300 in the axial direction 22 is configured between the impeller rear wall 120 and the housing 200. The impeller rear wall 120 here forms part of the axial bearing 300. More specifically, the impeller rear wall 120 forms the (above-mentioned) first bearing face of the axial bearing 300 that is oriented in the direction of the smooth film 320, and the smooth film 320 (as has already been mentioned above) forms the second bearing face of the axial bearing 300. It can furthermore be seen that the axial bearing 300 in the axial direction 22 is configured between the impeller rear wall 120 and the impeller housing rear wall 216 of the housing 200. The impeller housing rear wall 216 here forms part of the axial bearing 300. The corrugated film 310 and the smooth film 320 in the axial direction 22 are disposed so as to bear directly adjacently on one another, as has already been discussed. The corrugated film 310 in the axial direction 22 here is disposed so as to be directly adjacent to the impeller housing rear wall 216. The smooth film 320 in the axial direction 22 here is disposed so as to be directly adjacent to the impeller rear wall 120. The impeller rear wall 120, the smooth film 320, the corrugated film 310 and the impeller housing rear wall 216 in the axial direction 22 are thus disposed so as to be next to one another. The impeller rear wall 120, the smooth film 320, the corrugated film 310 and the impeller housing rear wall 216 conjointly thus form the axial bearing 300 of the first embodiment (see in particular FIG. 2). This means that the impeller rear wall 120 and the impeller housing rear wall 216 assume part of the function of the axial bearing 300. The housing 200, or the impeller housing rear wall 216, respectively, as well as the impeller 100, or the impeller rear wall 120, respectively, thus form part of the axial bearing 300. In other words, this means that a functional part of the axial bearing 300 is in each case integrated in the impeller rear wall 120 and in the impeller housing rear wall 216. This means that the impeller 100 assumes part of the function of the axial bearing 300. Parts that are usually additionally required, such as the additional bearing disk 32 of the known supercharging device 20 from FIG. 1 that sits on the shaft 50, for example, can thus be dispensed with. This results in a lower parts count and a reduced requirement in terms of installation space. This results in particular in a reduced requirement in terms of installation space in the axial direction 22, this becoming obvious when comparing FIGS. 1 and 2. This ultimately leads to a more compact supercharging device 10. This means that the axial bearing 300 can in part be formed by parts that are already present in a supercharging device 10. The impeller housing rear wall 216 is embodied as a separate part in the figures. In alternative design embodiments, the impeller housing rear wall 216 can be formed so as to be integral to the bearing housing 220 of the housing 200.

In a second embodiment of the supercharging device 10 (see FIGS. 3A to 3C, for example), the impeller 100 comprises a cover element 130. The cover element 130 in the axial direction 22 here is disposed on the impeller 100 so as to be opposite the impeller rear wall 120. The cover element 130 is connected in a rotationally fixed manner to the impeller 100. The cover element 130 is formed so as to be integral to the impeller 100. In alternative design embodiments, the cover element 130 can also be formed so as to be separate from the impeller 100. FIG. 3C shows a front view of an arbitrary impeller 100 of FIG. 3A or 3B, viewed in the direction of the arrow P, without a housing 200 that surrounds the impeller 100. It can be seen here that the cover element 130 extends in an annular manner about the axis of the impeller 100. The cover element 130 comprises a circular central opening 134.

In this second embodiment of the supercharging device 10, the axial bearing 300, 300b in the axial direction 22 is configured between the cover element 130 and the housing 200. The cover element 130 here forms part of the axial bearing 300, 300b. More specifically, the cover element 130 forms the (above-mentioned) first bearing face of the axial bearing 300, 300b that is oriented in the direction of the smooth film 320, and the smooth film 320 (as has already been mentioned above) forms the second bearing face of the axial bearing 300, 300b. It can furthermore be seen that the axial bearing 300, 300b in the axial direction 22 is configured between the cover element 130 and an impeller housing wall 214 of the impeller housing 210. A wall portion of the impeller housing 210 that in the axial direction in terms of the impeller 100 is disposed so as to be opposite the impeller housing rear wall 216, thus not so as to be proximal to the shaft (see above), is to be referred to as the impeller housing wall 214 here. The face 215 of the impeller housing wall 214 here is oriented in the direction of the impeller 100. The impeller housing wall 214 here forms part of the axial bearing 300, 300b (see FIGS. 3A and 3B, for example). The impeller housing wall 214 comprises a face 215 that in the axial direction 22 and in the radial direction 24 faces the cover element 130. The face 215 extends in an annular manner about the axis of the impeller 100. The face 215 of the impeller housing wall 214 here forms part of the axial bearing 300, 300b.

The corrugated film 310 and the smooth film 320 in the axial direction 22 are disposed so as to bear directly adjacently on one another, as has already been discussed. The corrugated film 310 in the axial direction 22 here is disposed so as to be directly adjacent to the impeller housing wall 214, or the face 215 of the latter, respectively. The smooth film 320 in the axial direction 22 here is disposed so as to be directly adjacent to the cover element 130. The cover element 130, the smooth film 320, the corrugated film 310 and the impeller housing wall 214, or the face 215 of the latter, respectively, in the axial direction 22 are thus disposed so as to be next to one another. The cover element 130, the smooth film 320, the corrugated film 310 and the impeller housing wall 214 conjointly thus form the axial bearing 300 of the second embodiment (see the axial bearing 300, 300b in FIGS. 3A and 3B). This means that the cover element 130 and the impeller housing wall 214, or the face 215 thereof, respectively, assume part of the function of the axial bearing 300, 300b. The housing 200, or the impeller housing wall 214, respectively, or the face 215 thereof, respectively, as well as the impeller 100, or the cover element 130, respectively, (see above) thus form part of the axial bearing 300, 300b.

Parts that are usually additionally required, such as the additional bearing disk 32 of the known supercharging device 20 from FIG. 1 that sits on the shaft 50, for example, can thus be dispensed with. The cover element 130 on the external geometry of the impeller blades that lies in the axial direction 22 here can be configured so as to be thin. The cover element 130 can furthermore follow the contours of the impeller blades. If at all, only a minimal additional space in the axial direction 22 is thus required for the cover element 130. As has already been mentioned, the cover element 130 can also be manufactured so as to be integral to the impeller 100 (see FIGS. 3A to 4B). This means that the axial bearing 300 can in part be formed by parts that are already present in a supercharging device 10. This results in a lower parts count and a reduced requirement in terms of installation space, in particular a reduced requirement in terms of installation space in the axial direction 22. This ultimately leads to a more compact supercharging device 10.

Depending on the type and the design embodiment of the impeller 100, the axial bearing 300 can be configured differently in the cross section. Accordingly, the corrugated film 310, the smooth film 320 and/or the cover element 130 can also be of different configurations.

Figure 3B:
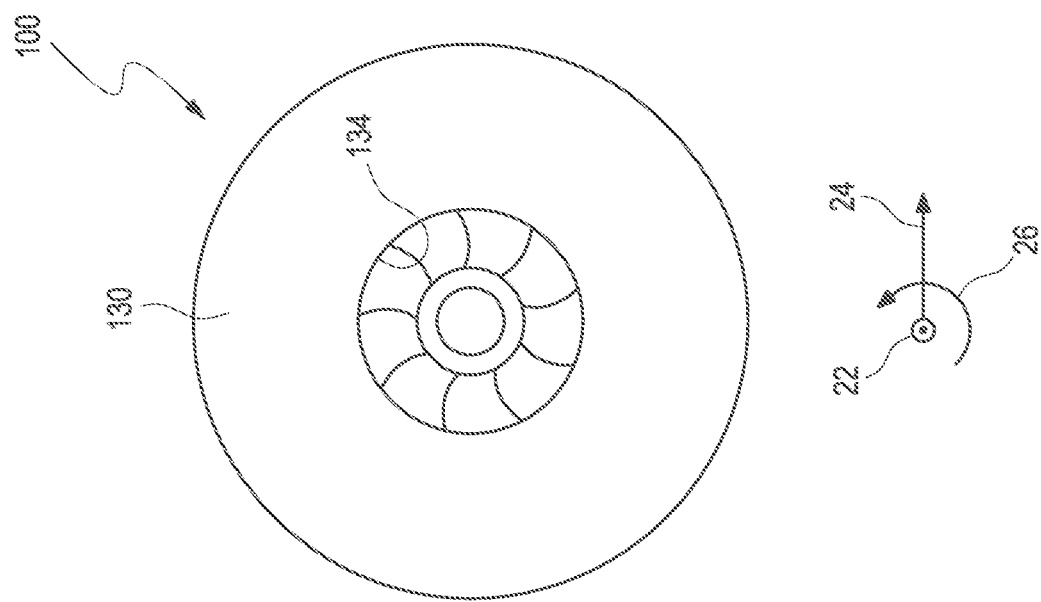
FIG. 3B shows a partial detail of a lateral sectional view of the supercharging device according to the invention from FIG. 3A, however having a 3D impeller instead of a 2D impeller.
Figure 3C:
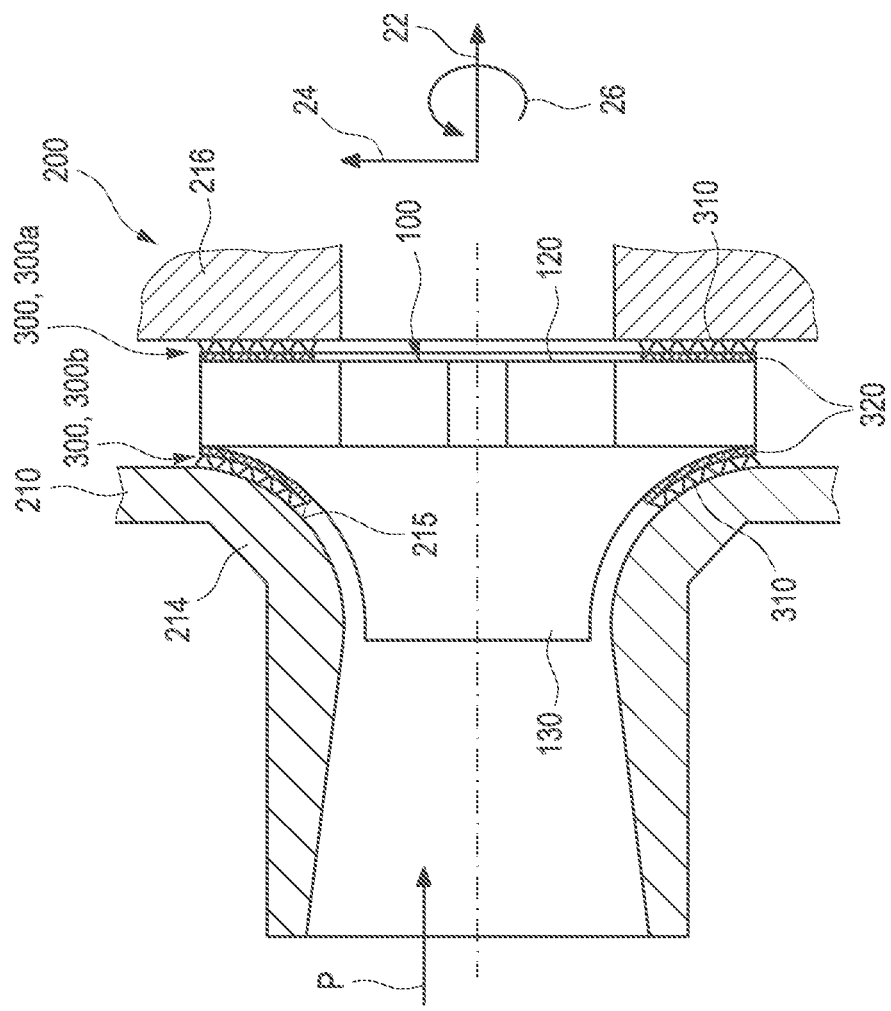
FIG. 3C shows a front view of an arbitrary impeller of the supercharging device according to the invention of the second embodiment, having a cover element.
Figure 4:
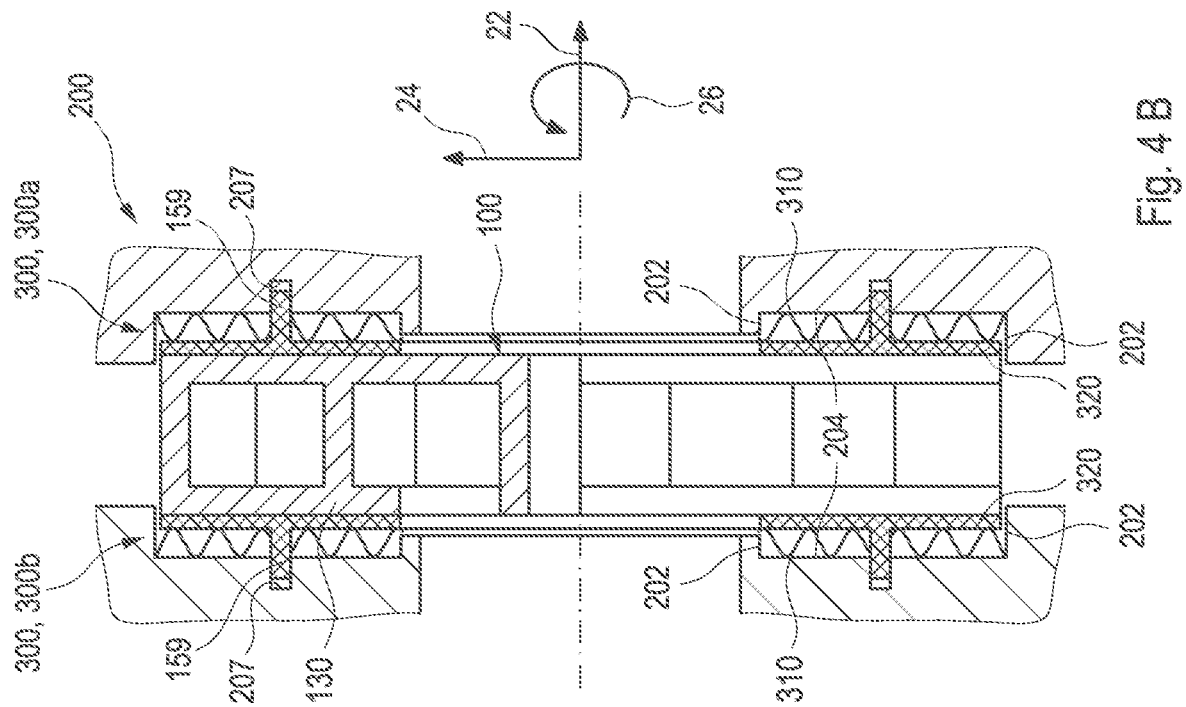
FIGS. 4A-4B show schematic partial details of a 2D impeller of the supercharging device according to the invention of the second embodiment, having exemplary design embodiments of the bearing films and of the housing.
Figure 4:
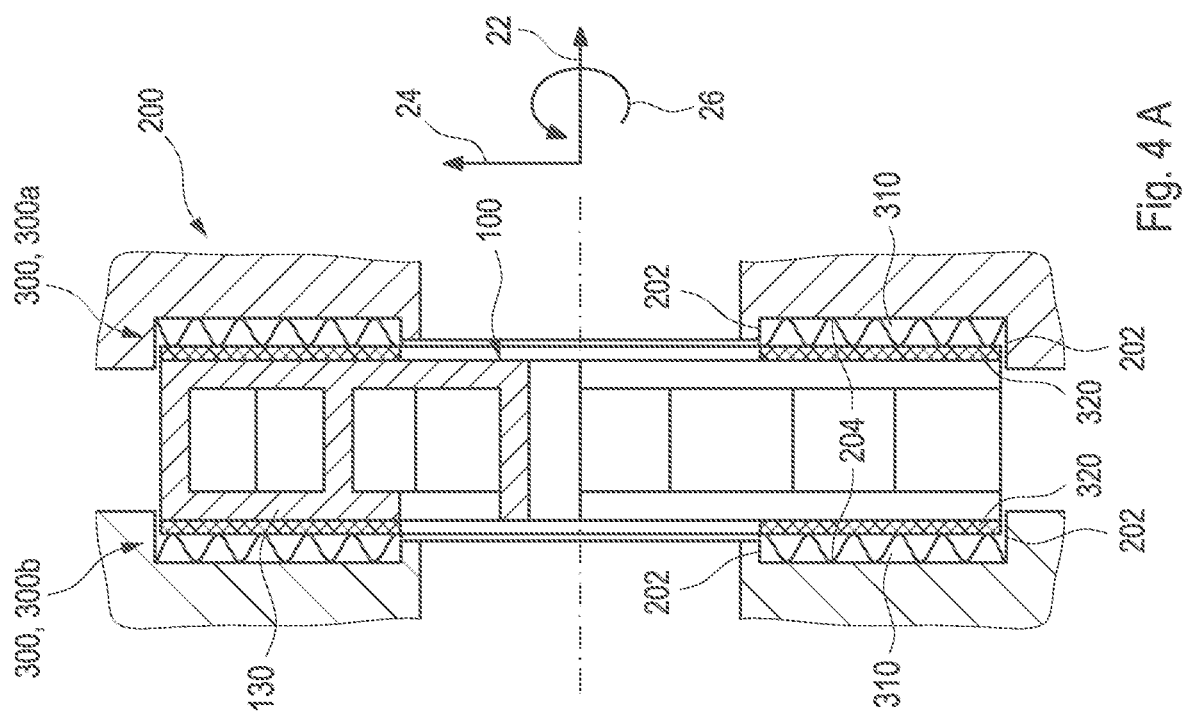

For example, the impeller 100 can be configured as a "3D impeller" 100 (see impellers 100, 100b in FIGS. 2 and 3B). Accordingly, the axial bearing 300 of the second embodiment, thus an axial bearing 300 according to the invention that is configured between the cover element 130 and the impeller housing wall 114, is configured with a curved cross section. A cross section here is in particular to be understood to be a cross section according to the lateral sectional views such as in FIG. 3B, for example. This means that the axial bearing 300 is adapted to the contour of the impeller 100 and/or to the contour of the housing 200. Accordingly, the cover element 130 is also configured with a curved cross section. This means that the cover element 130 is adapted to the contour of the "3D impeller" 100. In an analogous manner, the bearing films 310, 320 in a "3D impeller" 100 having an axial bearing 300 of the second embodiment are also configured with a curved cross section. In terms of the corrugated film 310, it is to be noted at this point that the corrugated film 310 in principle has corrugations, thus to a certain extent always has a sub-portion with a curved cross section. In the context of this application, however, the shape of the cross section is rather to be understood to be the average or mean profile of the respective element.

Furthermore, the impeller 100 can be configured as a "2D impeller" (see impellers 100, 100a in FIGS. 3A, 4A and 4B). Accordingly, the axial bearing 300 of the second embodiment, thus an axial bearing 300 according to the invention that is configured between the cover element 130 and the impeller housing wall 114, is configured with a substantially rectilinear cross section. A cross section here is in particular to be understood to be a cross section according to the lateral sectional views such as in FIG. 3A, for example. This means that the axial bearing 300 is adapted to the contour of the impeller 100 and/or to the contour of the housing 200. Accordingly, the cover element 130 is also configured with a substantially rectilinear cross section. This means that the cover element 130 is adapted to the contour of the "2D impeller" 100. In an analogous manner, the bearing films 310, 320 in a "2D impeller" 100 having an axial bearing 300 of the second embodiment are also configured with a substantially rectilinear cross section. In terms of the corrugated film 310, it is to be noted at this point that the corrugated film 310 in principle has corrugations, thus to a certain extent always has a sub-portion with a curved cross section. In the context of this application, however, the shape of the cross section is rather to be understood to be the average or mean profile of the respective element, said profile in conjunction with a "2D impeller" 100 always being substantially rectilinear.

The axial bearing 300 of the first embodiment, thus an axial bearing 300 according to the invention that is configured between the impeller rear wall 120 and the impeller housing rear wall 216, is configured with a substantially rectilinear cross section, independently of the type of the impeller 100. A cross section here is in particular to be understood to be a cross section according to the lateral sectional views such as in FIG. 2, for example. This means that the axial bearing 300 is adapted to the contour of the impeller 100 and/or to the contour of the housing 200. Accordingly, the cover element 130 is also configured with a substantially rectilinear cross section. This means that the cover element 130 is adapted to the contour of the impeller 100. In an analogous manner, the bearing films 310, 320 in an impeller 100 having an axial bearing 300 of the first embodiment are also configured with a substantially rectilinear cross section. In terms of the corrugated film 310, it is to be noted at this point that the corrugated film 310 in principle has corrugations, thus to a certain extent always has a sub-portion with a curved cross section. In the context of this application, however, the shape of the cross section is rather to be understood to be the average or mean profile of the respective element, said profile in/on the impeller rear wall 120, or on the impeller housing rear wall 216, respectively, typically always running in a rectilinear manner.

The invention comprises in particular different combinations of the two embodiments, or of parts of the two embodiments of the supercharging device 10, or of the axial bearing 300, respectively. Independently of the embodiment of the axial bearing 300, the axial bearing 300 according to the invention and according to the above embodiments is thus always disposed so as to be substantially within the impeller housing 210.

For example, the supercharging devices 10 of FIGS. 2 and 3A comprise in each case a first axial bearing 300a and a second axial bearing 300b. Furthermore, the supercharging devices 10 of FIGS. 2 and 3A comprise two impellers 100a, 100b, thus a first impeller 100a and a second impeller 100b. The first impeller 100a and the second impeller 100b here are connected in a rotationally fixed manner to one another by way of a shaft 400. The first impeller 100a and the second impeller 100b here are disposed on a first end 410a or on a second end 410b, respectively, of the shaft 400.

The first axial bearing 300a and the second axial bearing 300b of the supercharging device 10 of FIG. 2 here are in each case configured according to the first embodiment, thus in the axial direction 22 between the respective impeller rear wall 120 and the respective impeller housing rear wall 216. The first impeller 100a here forms part of the first axial bearing 300a. The second impeller 100b forms part of the second axial bearing 300b. The first axial bearing 300a and the second axial bearing 300b in the axial direction 22 here are in each case configured between the impeller rear wall 120 and the impeller housing rear wall 216. Alternatively to these design embodiments it would also be conceivable for the first axial bearing 300a and the second axial bearing 300b to be configured according to the second embodiment, thus in the axial direction 22 between the cover element 130 and the impeller housing wall 214 (not shown).

In design embodiments in which both axial bearings 300a, 300b are designed according to identical embodiments, the axial bearings 300a, 300b always sit on different impellers 100a, 100b.

The first axial bearing 300a and the second axial bearing 300b of the supercharging device 10 of FIG. 3A are configured differently in comparison to those of the supercharging device 10 of FIG. 2. The first axial bearing 300a is configured according to the first embodiment, thus in the axial direction 22 between the impeller rear wall 120 and the impeller housing rear wall 216. The second axial bearing 300b is configured according to the second embodiment, thus in the axial direction 22 between the cover element 130 and the impeller housing wall 214. The first impeller 100a here forms part of the first axial bearing 300a as well as part of the second axial bearing 300b. This means that the first axial bearing 300a as well as the second axial bearing 300b sit on the first impeller 100a. Alternatively, both axial bearings 300a, 300b could also sit on the second impeller 100b. Accordingly, the second impeller 100b could also form part of the first axial bearing 300a as well as part of the second axial bearing 300b.

In design embodiments in which the axial bearings 300a, 300b are designed according to different embodiments, the axial bearings 300a, 300b can sit exclusively on one impeller 100, 100a, 100b (see FIGS. 3A and 3B). Alternatively, in alternative design embodiments not shown here, a first axial bearing 300a according to the first embodiment could sit on a first impeller 100a, and a second axial bearing 300b according to the second embodiment could sit on a second impeller 100b.

In all embodiments previously described, at least the parts of the corresponding impeller 100, or of the corresponding impellers 100, respectively, that form part of the axial bearing 300 (thus at least the regions acting as the first bearing face), can have a coating. In embodiments having a cover element 130, the cover element 130, either completely or at least in the corresponding regions that act as the first bearing face of the axial bearing 300, can have a coating. The coating on the impeller 100, or the impellers 100, respectively, and/or on the cover element 130 is designed in such a manner that said coating hardens the surface of the corresponding component and/or reduces the coefficient of friction in these surface regions. The coating thus acts as a protective layer against wear, on the one hand, and can minimize friction, in particular when accelerating the supercharging device 10, on the other hand.

The coating can be provided either as a separate element which is connected to the impeller 100, or to the cover element 130, respectively. The connection can be performed by a press-fit or by way of a screwed connection, for example. Other joining methods such as riveting, welding, friction welding or shrink-fitting can also be considered to this end. Alternatively to the separate element, the coating is applied directly in a thermal or chemical manner to the compressor wheel 100, or to the cover element 130, respectively. For example, the coating can be performed by hard anodizing or hard electroplating (hard chromium plating).

One or a plurality from DLC (diamond-like carbon), titanium nitride, chromium nitride and/or chromium carbon nitride can be used as a material for the coating, to mention a few examples.

The impeller 100 in principle can be a compressor wheel or a turbine wheel. In the figures (see FIGS. 2 and 3A, for example), the first impeller 100*a* is a compressor wheel and the second impeller 100*b* is a turbine wheel. In alternative design embodiments, the first impeller 100*a* can be a turbine wheel and the second impeller 100*b* can be a compressor wheel. As has already been mentioned, the first impeller 100*a* can be a compressor wheel and the second impeller 100*b* can be a compressor wheel. In the latter case, both compressor wheels 100*a*, 100*b* can be driven by the electric motor 700. The two compressor wheels 100*a*, 100*b* can also be coupled to one another in such a manner that said two compressor wheels 100*a*, 100*b* conjointly form a dual-stage compressor system. The supercharging device 10 when comprising two impellers 100*a*, 100*b* is explained hereunder only in the context of one compressor wheel 100 and one turbine wheel 100 and the corresponding associated parts (such as the compressor housing 210 and the turbine housing 210, etc., for example). This is not to be understood in such a manner that the invention is limited to combinations of this type. This means that the invention also comprises analogous design embodiments in which both impellers 100 are compressor wheels. This applies also to correspondingly associated parts such as, for example, impeller housing rear walls 216 or impeller housings 210.

The housing 200 can comprise two impeller housings 210. The housing 200 can furthermore comprise two impeller housing rear walls 216. A first impeller housing 210 here can be a compressor housing, and a second impeller housing 210 can be a turbine housing. Alternatively, the first impeller housing 210 can be a turbine housing, and the second impeller housing 210 can be a compressor housing. Furthermore, a first impeller housing rear wall 216 can be a compressor housing rear wall, and a second impeller housing rear wall 216 can be a turbine housing rear wall. Alternatively, the first impeller housing rear wall 216 can be a turbine housing rear wall, and the second impeller housing rear wall 216 can be a compressor housing rear wall.

Figure 6:
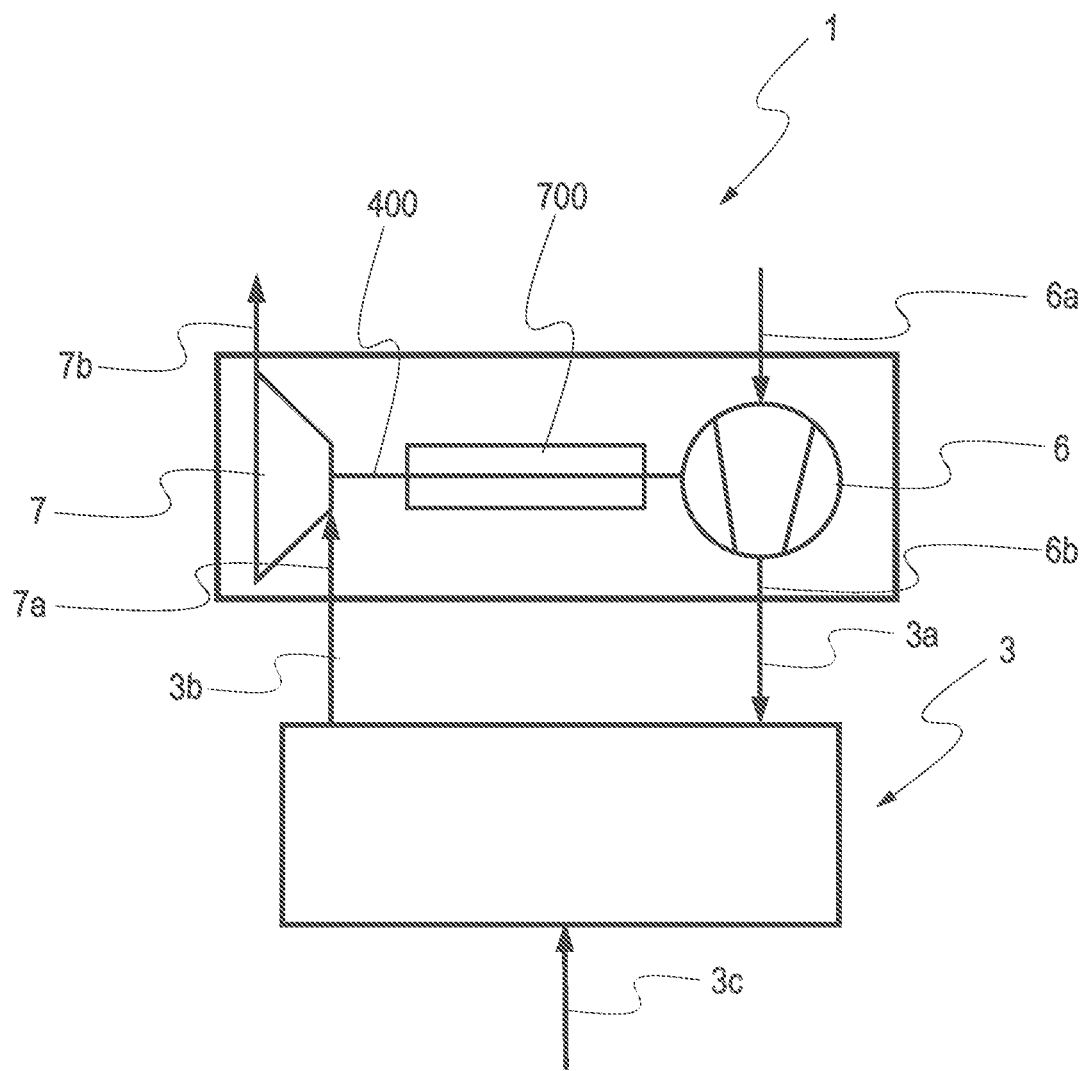
FIG. 6 shows a schematic illustration of the supercharging device according to the invention, having a fuel cell.

The supercharging device 10 can in particular be conceived for use with a fuel cell 3. In this context, FIG. 6 shows a heavily simplified schematic view of a supercharging device 10 according to the invention (such as, for example, a supercharging device 10 as explained in the context of the preceding figures), having a compressor 6, a turbine 7 and an electric motor 700. Air by way of a compressor inlet 6*a* flows into the compressor 6 and is compressed therein. The compressed air, by way of a compressor outlet 6*b* that is connected to an air inlet 3*a* of the fuel cell 3, flows into the fuel cell 3 so as to react with hydrogen. The fuel cell 3 can be supplied with hydrogen by way of a hydrogen infeed 3*c*. The reaction product (water vapor) can be conveyed out of the fuel cell 3 by way of an air outlet 3*b*. As is illustrated in FIG. 6, the reaction product here can serve for driving the turbine 7. To this end, the air outlet 3*b* is connected to a turbine inlet 7*a* of the turbine 7, as a result of which the turbine 7, or the turbine wheel, respectively, can be driven by the reaction product before the reaction product exits the turbine 7 and the supercharging device 10 by way of a turbine outlet 7*b*. The turbine 7 here drives the compressor 6 by way of the common shaft 400. Alternatively or additionally, an electric motor 700 here can likewise drive the compressor 6 by way of the shaft 400. An air mounting here is particularly advantageous because the fuel cell 3 must not be contaminated with foreign matter so as to preclude any risk of damage or failure. In the case of an oil-lubricated mounting, this could only be guaranteed by a perfect oil tightness, the latter if at all being able to be implemented only with great complexity. The air mounting thus also leads to a more reliable drive system, in particular when used with a fuel cell 3.

Although the present invention has been described above and defined in the appended claims, it should be understood that the invention may alternatively also be defined in accordance with the following embodiments:

1. A supercharging device (10) comprising:
   a housing (200);
   at least one impeller (100);
   at least one axial bearing (300),
   characterized in that
   the impeller (100) forms part of the axial bearing (300).
2. The supercharging device (10) according to embodiment 1, wherein the axial bearing (300) is an air bearing.
3. The supercharging device (10) according to embodiment 1 or embodiment 2, wherein the axial bearing (300) in the axial direction (22) is configured between the impeller (100) and the housing (200), and wherein the housing (200) forms part of the axial bearing (300).
4. The supercharging device (10) according to any one of the preceding embodiments, wherein the axial bearing (300) comprises at least one corrugated film (310) and/or at least one smooth film (320).
5. The supercharging device (10) according to embodiment 4, wherein the corrugated film (310) and the smooth film (320) in the axial direction (22) are disposed so as to bear directly adjacently on one another.
6. The supercharging device (10) according to either of embodiments 4 and 5, wherein the corrugated film (310) in the axial direction (22) is disposed so as to be directly adjacent to the housing (200), and wherein the smooth film (320) in the axial direction (22) is disposed so as to be adjacent to the impeller (100).
7. The supercharging device (10) according to any one of embodiments 4 to 6, wherein the corrugated film (310) bears on the housing (200) and is conceived for pretensioning the smooth film (320) in the axial direction (22) in relation to the impeller (100).
8. The supercharging device (10) according to any one of embodiments 4 to 7, wherein the corrugated film (310) as a result of a movement of the smooth film (320) in the axial direction (22) is conceived so as to be elastically compressible between the smooth film (320) and the housing (200) so that an air gap in the axial direction (22) between the impeller (100) and the smooth film (320) is able to be configured during the operation.

9. The supercharging device (10) according to any one of embodiments 4 to 8, wherein the corrugated film (310) and/or the smooth film (320) each comprise at least one securing element (157, 159) which is conceived so as to be able to be brought to engage with a geometric element (207, 209) of the housing (200), in particular with a recess (207) and/or with an elevation (209) of the housing (200) in order to secure the corrugated film (310) and/or the smooth film (320) against dislocations in the circumferential direction (26) and/or dislocations in the radial direction (24).

10. The supercharging device (10) according to embodiment 9, wherein the respective securing element (157, 159) in the installed state in the axial direction (22) projects from the corrugated film (310) and/or the respective smooth film (320) or is recessed in the latter, in particular wherein the securing element (157, 159) is configured as a web-shaped elevation (159) which extends in the radial direction (24) and in the axial direction (22).

11. The supercharging device (10) according to any one of embodiments 4 to 10, wherein the corrugated film (310) and/or the smooth film (320) are secured by the housing (200) against dislocations in the radial direction (24).

12. The supercharging device (10) according to any one of the preceding embodiments, wherein the housing (200) comprises a stepped shoulder (202) which is disposed on a face of the housing (200) that in the axial direction (22) faces the impeller (100), wherein the stepped shoulder (202) radially outside an external circumference of the axial bearing (300) projects from the housing (200) in the axial direction (22), and wherein the stepped shoulder (202) extends in an annular manner about the axis of the impeller (100).

13. The supercharging device (10) according to any one of embodiments 4 to 11, wherein the housing (200) comprises a stepped shoulder (202) which is disposed on a face of the housing (200) that in the axial direction (22) faces the impeller (100), wherein the stepped shoulder (202) radially outside an external circumference of the corrugated film (310) and/or radially outside an external circumference of the smooth film (320) projects from the housing (200) in the axial direction (22), and wherein the stepped shoulder (202) extends in an annular manner about the axis of the impeller (100).

14. The supercharging device (10) according to any one of the preceding embodiments, wherein the housing (200) comprises a depression (204) which is configured in the axial direction (22) and on a face of the housing (200) that in the axial direction (22) faces the impeller (100) extends in an annular manner about the axis of the impeller (100), wherein the depression (204) is conceived for receiving the axial bearing (300).

15. The supercharging device (10) according to any one of embodiments 4 to 13, wherein the housing (200) comprises a depression (204) which is configured in the axial direction (22) and on a face of the housing (200) that in the axial direction (22) faces the impeller (100) extends in an annular manner about the axis of the impeller (100), wherein the depression (204) is conceived for receiving the corrugated film (310) and/or the smooth film (320).

16. The supercharging device (10) according to any one of the preceding embodiments, wherein the axial bearing (300) is configured so as to be annular.

17. The supercharging device (10) according to any one of the preceding embodiments, wherein the corrugated film (310) and the smooth film (320) are configured in the manner of annular segments.

18. The supercharging device (10) according to any one of the preceding embodiments, wherein the impeller (100) comprises an impeller rear wall (120).

19. The supercharging device (10) according to embodiment 18, wherein the axial bearing (300) in the axial direction (22) is configured between the impeller rear wall (120) and the housing (200), and wherein the impeller rear wall (120) forms part of the axial bearing (300).

20. The supercharging device (10) according to either of embodiments 18 and 19, wherein the axial bearing (300) in the axial direction (22) is configured between the impeller rear wall (120) and an impeller housing rear wall (216) of the housing (200), and wherein the impeller housing rear wall (216) forms part of the axial bearing (300), and, optionally, wherein the impeller housing rear wall (216) is formed so as to be integral to a bearing housing (220) of the housing (200).

21. The supercharging device (10) according to any one of embodiments 18 to 20, wherein the axial bearing (300) is configured with a rectilinear cross section.

22. The supercharging device (10) according to any one of embodiments 18 to 21, wherein the impeller rear wall (120), the corrugated film (310), the smooth film (320) and the impeller housing rear wall (216) are configured with a rectilinear cross section.

23. The supercharging device (10) according to embodiment 18, wherein the impeller (100) comprises a cover element (130) which in the axial direction (22) is disposed on the impeller (100) so as to be opposite the impeller rear wall (120) and connected in a rotationally fixed manner to the impeller (100).

24. The supercharging device (10) according to embodiment 23, wherein the cover element (130) extends in an annular manner about the axis of the impeller (100) and comprises a circular central opening (134).

25. The supercharging device (10) according to either of embodiments 23 and 24, wherein the cover element (130) is formed so as to be integral to the impeller (100).

26. The supercharging device (10) according to any one of embodiments 23 to 25, wherein the axial bearing (300) in the axial direction (22) is configured between the cover element (130) and the housing (200), and wherein the cover element (130) forms part of the axial bearing (300).

27. The supercharging device (10) according to any one of embodiments 23 to 26, wherein the axial bearing (300) in the axial direction (22) is configured between the cover element (130) and an impeller housing wall (214) of an impeller housing (210) of the housing (200), and wherein the impeller housing wall (214) forms part of the axial bearing (300).

28. The supercharging device (10) according to embodiment 27, wherein the impeller housing wall (214) comprises a face (215) that in the axial direction (22) and/or the radial direction (24) faces the cover element (130) and extends in an annular manner about the axis of the impeller (100), and wherein the face (215) forms part of the axial bearing (300).

29. The supercharging device (10) according to any one of embodiments 23 to 28, wherein the axial bearing (300) is configured with a rectilinear cross section.

30. The supercharging device (10) according to any one of embodiments 23 to 29, wherein the cover element (130), the corrugated film (310), the smooth film (320) and the impeller housing wall (214) and/or the face (215) are configured with a rectilinear cross section.

31. The supercharging device (10) according to any one of embodiments 23 to 28, wherein the axial bearing (300) is configured with a curved cross section.

32. The supercharging device (10) according to any one of embodiments 23 to 28, or 31, wherein the cover element (130), the corrugated film (310), the smooth film (320) and the impeller housing wall (214) and/or the face (215) are configured with a curved cross section.

33. The supercharging device (10) according to any one of embodiments 26 to 32, wherein at least the parts of the cover element (130) that form part of the axial bearing (300) have a coating.

34. The supercharging device (10) according to any one of the preceding embodiments, wherein at least the parts of the impeller (100) that form part of the axial bearing (300) have a coating.

35. The supercharging device according to embodiment 33 or according to embodiment 34, wherein the coating comprises at least one of DLC (diamond-like carbon), titanium nitride, chromium nitride and/or chromium carbon nitride.

36. The supercharging device (10) according to any one of the preceding embodiments, wherein the supercharging device (10) comprises a first axial bearing (300a) and a second axial bearing (300b).

37. The supercharging device (10) according to embodiment 36, wherein the first axial bearing (300a) is configured according to any one of embodiments 19 to 22, and the second axial bearing (300b) is configured according to any one of embodiments 23 to 32.

38. The supercharging device (10) according to any one of the preceding embodiments, wherein the supercharging device (10) comprises a first impeller (100a), a second impeller (100b) and a shaft (400), wherein the first impeller (100a) and the second impeller (100b) each at one end (410a, 410b) of the shaft (400) are attached in a rotationally fixed manner and by way of the shaft connected in a rotational manner to one another.

39. The supercharging device (10) according to embodiment 38, when dependent on embodiment 33, wherein the first impeller (100a) is part of the first axial bearing (300a), and wherein the first axial bearing (300a) is configured according to any one of embodiments 19 to 22.

40. The supercharging device (10) according to embodiment 39, wherein the first impeller (100a) is part of the second axial bearing (300b), and wherein the second axial bearing (300b) is configured according to any one of embodiments 23 to 32.

41. The supercharging device (10) according to embodiment 39, wherein the second impeller (100b) is part of the second axial bearing (300b), and wherein the second axial bearing (300b) is configured according to any one of embodiments 19 to 22, or according to any one of embodiments 23 to 32.

42. The supercharging device (10) according to embodiment 38, when dependent on embodiment 36, wherein the first impeller (100a) is part of the first axial bearing (300a), and wherein the first axial bearing (300a) is configured according to any one of embodiments 23 to 32.

43. The supercharging device (10) according to embodiment 42, wherein the second impeller (100b) is part of the second axial bearing (300b), and wherein the second axial bearing (300b) is configured according to any one of embodiments 19 to 22, or according to any one of embodiments 23 to 32.

44. The supercharging device (10) according to embodiment 38, when dependent on embodiment 36, wherein the second impeller (100b) is part of the first axial bearing (300a) and part of the second axial bearing (300b), and wherein the first axial bearing (300a) is configured according to any one of embodiments 19 to 22, and the second axial bearing (300b) is configured according to any one of embodiments 23 to 32.

45. The supercharging device (10) according to any one of embodiments 1 to 37, wherein the impeller (100) is a compressor wheel or a turbine wheel.

46. The supercharging device (10) according to any one of embodiments 38 to 44, wherein the first impeller (100a) is a compressor wheel, and wherein the second impeller (100b) is a turbine wheel.

47. The supercharging device (10) according to any one of embodiments 38 to 44, wherein the first impeller (100a) is a compressor wheel, and wherein the second impeller (100b) is a compressor wheel.

48. The supercharging device (10) according to any one of the preceding embodiments, wherein the housing (200) comprises a first impeller housing (210a) and a second impeller housing (210b), wherein the first impeller housing (210a) is a compressor housing and the second impeller housing (210b) is a turbine housing, and, optionally, wherein the supercharging device (10) is conceived for use with a fuel cell (3).

The invention claimed is:

1. A supercharging device (10) comprising:
a housing (200) having an axial bearing surface; and
at least one impeller (100) having a rear wall (120) having an axial bearing surface;
wherein the impeller (100) rear wall (120) axial bearing surface opposes the housing (200) axial bearing surface and together with the housing (200) axial bearing surface forms an axial bearing (300),
wherein the impeller (100) rear wall (120) axial bearing surface has a coating, and
wherein the coating comprises at least one of DLC (diamond-like carbon), titanium nitride, chromium nitride and chromium carbon nitride.

2. The supercharging device (10) as claimed in claim 1, wherein the axial bearing (300) is an air bearing.

3. The supercharging device (10) as claimed in claim 1, wherein the housing (200) forms or incorporates one of the bearing surfaces of the axial bearing (300).

4. The supercharging device (10) as claimed in claim 1, wherein the axial bearing (300) comprises at least one of a corrugated film (310) and a smooth film (320).

5. The supercharging device (10) as claimed in claim 1, wherein at least one corrugated film (310) and one smooth film (320) are incorporated in the housing, and wherein the corrugated film (310) and the smooth film (320) in the axial direction (22) are disposed so as to bear directly adjacently on one another.

6. The supercharging device (10) as claimed in claim 5, wherein the corrugated film (310) in the axial direction (22) is disposed so as to be directly adjacent to the housing (200), and wherein the smooth film (320) in the axial direction (22) is disposed so as to be adjacent to the impeller (100).

7. The supercharging device (10) as claimed in claim 5, wherein the housing (200) comprises a stepped shoulder (202) which is disposed on a face of the housing (200) that in the axial direction (22) faces the impeller (100), wherein the stepped shoulder (202) radially outside an external circumference of the corrugated film (310) and/or radially outside an external circumference of the smooth film (320)

projects from the housing (200) in the axial direction (22), and wherein the stepped shoulder (202) extends in an annular manner about the axis of the impeller (100).

8. The supercharging device (10) as claimed in claim 1, wherein the axial bearing (300) in the axial direction (22) is configured between the impeller rear wall (120) and an impeller housing rear wall (216) of the housing (200), and wherein the impeller housing rear wall (216) forms one of the bearing surfaces of the axial bearing (300).

9. The supercharging device (10) as claimed in claim 1, wherein the impeller (100) comprises a cover element (130) which in the axial direction (22) is disposed on the impeller (100) so as to be opposite the impeller rear wall (120) and connected in a rotationally fixed manner to the impeller (100), and wherein a cover element (130) axial bearing (300) in the axial direction (22) is configured between the cover element (130) and the housing (200), and wherein the cover element (130) forms one of the bearing surfaces of the cover element (130) axial bearing (300).

10. The supercharging device (10) as claimed in claim 9, wherein the cover element (130) axial bearing (300) in the axial direction (22) is configured between the cover element (130) and an impeller housing wall (214) of an impeller housing (210) of the housing (200), and wherein the impeller housing wall (214) forms one of the bearing surfaces of the axial bearing (300).

11. The supercharging device (10) as claimed in claim 9, wherein at least the one of the bearing surfaces of the cover element (130) that form one of the bearing surfaces of the cover element (130) axial bearing (300) have a coating.

12. The supercharging device (10) as claimed in claim 1, wherein the supercharging device (10) comprises a first impeller (100*a*), a second impeller (100*b*) and a shaft (400), wherein the first impeller (100*a*) and the second impeller (100*b*) each at one end (410*a*, 410*b*) of the shaft (400) are attached to the shaft in a rotationally fixed manner and wherein the shaft is mounted in a rotational manner.

13. A fuel cell (3) comprising a supercharging device (10) comprising:
- a housing (200) having an axial bearing surface; and
- at least one impeller (100) having a rear wall (120) having an axial bearing surface;
- wherein the impeller (100) rear wall (120) axial bearing surface opposes the housing (200) axial bearing surface and together with the housing (200) axial bearing surface forms an axial bearing (300),
- wherein the impeller (100) rear wall (120) axial bearing surface has a coating, and
- wherein the coating comprises at least one of DLC (diamond-like carbon), titanium nitride, chromium nitride and chromium carbon nitride.

14. The supercharging device (10) as claimed in claim 1, wherein the axial bearing (300) in the axial direction (22) is configured between the impeller rear wall (120) and an impeller housing rear wall (216) of the housing (200), wherein the impeller housing rear wall (216) forms one of the bearing surfaces of the axial bearing (300), and wherein the impeller housing rear wall (216) is formed so as to be integral to a bearing housing (220) of the housing (200).

15. The supercharging device (10) as claimed in claim 5, wherein the at least one corrugated film (310) and one smooth film (320) are non-rotatingly incorporated in the housing.

\* \* \* \* \*